(12) United States Patent
Hoffert et al.

(10) Patent No.: US 9,792,010 B2
(45) Date of Patent: *Oct. 17, 2017

(54) SYSTEM AND METHOD FOR SWITCHING BETWEEN MEDIA ITEMS IN A PLURALITY OF SEQUENCES OF MEDIA ITEMS

(71) Applicant: Spotify AB, Stockholm (SE)

(72) Inventors: Eric Hoffert, New York, NY (US);
Mike Berkley, New York, NY (US);
Dejan Sormaz, New York, NY (US);
Tobias Schneider, Brooklyn, NY (US);
Frank Conway, Hoboken, NJ (US);
Kevin Faaborg, New York, NY (US)

(73) Assignee: SPOTIFY AB, Stockholm (SE)

(*) Notice: Subject to any disclaimer, the term of this patent is extended or adjusted under 35 U.S.C. 154(b) by 272 days.

This patent is subject to a terminal disclaimer.

(21) Appl. No.: 14/743,702

(22) Filed: Jun. 18, 2015

(65) Prior Publication Data

US 2015/0370466 A1    Dec. 24, 2015

Related U.S. Application Data

(63) Continuation of application No. 14/222,299, filed on Mar. 21, 2014, now Pat. No. 9,063,640.

(Continued)

(51) Int. Cl.
*G06F 3/0484* (2013.01)
*G06F 3/0482* (2013.01)
(Continued)

(52) U.S. Cl.
CPC .......... *G06F 3/0484* (2013.01); *G06F 3/0482* (2013.01); *G06F 3/0488* (2013.01);
(Continued)

(58) Field of Classification Search
CPC .............. H04N 21/482; H04N 21/2187; G06F 3/04883; G06F 17/30849; G06F 3/017;
(Continued)

(56) References Cited

U.S. PATENT DOCUMENTS 5,682,207 A    10/1997 Takeda et al.
5,896,128 A     4/1999 Boyer
(Continued)

FOREIGN PATENT DOCUMENTS

EP    1672923 A1    6/2006
EP    1775953 A1    4/2007
(Continued)

OTHER PUBLICATIONS

Spotify AB, International Preliminary Report on Patentability, PCTUS2014/042571, dated Dec. 22, 2015, 12 pgs.

(Continued)

*Primary Examiner* — Nicholas Ulrich
(74) *Attorney, Agent, or Firm* — Morgan, Lewis & Bockius LLP

(57) ABSTRACT

An electronic device with one or more processors, memory, and a touchscreen plays a first media item in a full-screen mode on the touchscreen. In response to detecting a contact on the touchscreen, the first media item shrinks into a region of the touchscreen and continues to play in the region, while a new media item is displayed outside of the region. In response to detecting movement of the contact, the shrunken first media item moves away from the region and the new media item moves into the region.

20 Claims, 18 Drawing Sheets

Related U.S. Application Data

(60) Provisional application No. 61/892,343, filed on Oct. 17, 2013.

(51) Int. Cl.
    *G06F 17/30* (2006.01)
    *H04N 21/482* (2011.01)
    *H04N 21/422* (2011.01)
    *H04N 21/433* (2011.01)
    *H04N 21/472* (2011.01)
    *G06F 3/0488* (2013.01)
    *G06F 3/01* (2006.01)

(52) U.S. Cl.
    CPC .... *G06F 3/04847* (2013.01); *G06F 17/30849* (2013.01); *H04N 21/42204* (2013.01); *H04N 21/433* (2013.01); *H04N 21/47202* (2013.01); *H04N 21/482* (2013.01); *G06F 3/017* (2013.01); *H04N 21/4825* (2013.01)

(58) Field of Classification Search
    CPC ............... G06F 3/0488; G06F 3/0484; G06F 2203/04803; G06F 3/04886; G06F 3/0416; G06F 3/0485; G06F 2203/04806; G06F 3/04845; G06F 3/04842; G06F 3/0482

See application file for complete search history.

(56) References Cited

U.S. PATENT DOCUMENTS

| | | |
|---|---|---|
| 6,208,354 B1 | 3/2001 | Porter |
| 6,384,869 B1 | 5/2002 | Sciammarella et al. |
| 6,590,618 B1 | 7/2003 | Park et al. |
| 6,671,453 B2 | 12/2003 | Yagura et al. |
| 6,804,824 B1 | 10/2004 | Potrebic et al. |
| 6,919,929 B1 | 7/2005 | Iacobelli et al. |
| 7,165,050 B2 | 1/2007 | Marking |
| 7,519,223 B2 | 4/2009 | Dehlin et al. |
| 7,797,713 B2 | 9/2010 | Dawson et al. |
| 8,146,019 B2 | 3/2012 | Kim et al. |
| 8,214,619 B1 | 7/2012 | Connolly |
| 8,340,654 B2 | 12/2012 | Bratton |
| 8,341,662 B1 | 12/2012 | Bassett et al. |
| 8,341,681 B2 | 12/2012 | Walter et al. |
| 8,434,006 B2 | 4/2013 | Profitt |
| 8,532,464 B2 | 9/2013 | Randall |
| 8,564,728 B2 | 10/2013 | Petersson et al. |
| 8,606,954 B1 | 12/2013 | Abidogun et al. |
| 8,683,377 B2 | 3/2014 | Zuverink et al. |
| 8,736,557 B2 | 5/2014 | Chaudhri |
| 8,908,110 B2 | 12/2014 | Yamashita et al. |
| 9,032,412 B1 | 5/2015 | Davidson et al. |
| 9,071,798 B2 | 6/2015 | Hoffert |
| 2001/0003846 A1 | 6/2001 | Rowe et al. |
| 2001/0030660 A1 | 10/2001 | Zainoulline |
| 2002/0089587 A1 | 7/2002 | White et al. |
| 2002/0116701 A1 | 8/2002 | Asada et al. |
| 2004/0003399 A1 | 1/2004 | Cooper |
| 2004/0056885 A1 | 3/2004 | Azami et al. |
| 2004/0221306 A1 | 11/2004 | Noh |
| 2004/0261127 A1 | 12/2004 | Freeman et al. |
| 2005/0114885 A1 | 5/2005 | Shikata et al. |
| 2005/0138658 A1 | 6/2005 | Bryan |
| 2005/0234992 A1 | 10/2005 | Haberman |
| 2006/0015904 A1 | 1/2006 | Marcus |
| 2006/0061688 A1 | 3/2006 | Choi |
| 2006/0075428 A1 | 4/2006 | Farmer et al. |
| 2006/0159184 A1 | 7/2006 | Jang |
| 2006/0218250 A1 | 9/2006 | Nakase |
| 2006/0245605 A1 | 11/2006 | Matsunaga |
| 2006/0259877 A1 | 11/2006 | Kaminagayoshi |
| 2006/0282864 A1 | 12/2006 | Gupte |
| 2007/0028270 A1 | 2/2007 | Ostojic et al. |
| 2007/0067815 A1 | 3/2007 | Bowen et al. |
| 2007/0083911 A1 | 4/2007 | Madden et al. |
| 2007/0169156 A1 | 7/2007 | Zeng |
| 2007/0263066 A1 | 11/2007 | Henning et al. |
| 2008/0056273 A1 | 3/2008 | Pelletier et al. |
| 2008/0126919 A1 | 5/2008 | Uskali et al. |
| 2008/0155459 A1 | 6/2008 | Ubillos |
| 2008/0242280 A1 | 10/2008 | Shapiro et al. |
| 2008/0244092 A1 | 10/2008 | Kosaka et al. |
| 2009/0010324 A1 | 1/2009 | Yamamoto |
| 2009/0046545 A1 | 2/2009 | Blinnikka |
| 2009/0055506 A1 | 2/2009 | Hudson et al. |
| 2009/0100380 A1 | 4/2009 | Gardner et al. |
| 2009/0119594 A1 | 5/2009 | Hannuksela |
| 2009/0132599 A1 | 5/2009 | Soroushian et al. |
| 2009/0195515 A1 | 8/2009 | Lee |
| 2009/0198827 A1 | 8/2009 | Hughes |
| 2009/0234967 A1 | 9/2009 | Yu et al. |
| 2009/0235170 A1 | 9/2009 | Golden |
| 2009/0297123 A1 | 12/2009 | Virdi et al. |
| 2010/0049864 A1 | 2/2010 | Lu et al. |
| 2010/0066918 A1 | 3/2010 | Gupta et al. |
| 2010/0077441 A1 | 3/2010 | Thomas et al. |
| 2010/0095240 A1* | 4/2010 | Shiplacoff ............ G06F 3/0483 715/784 |
| 2010/0153999 A1 | 6/2010 | Yates |
| 2010/0162180 A1 | 6/2010 | Dunnam et al. |
| 2010/0175026 A1 | 7/2010 | Bortner et al. |
| 2010/0180297 A1 | 7/2010 | Levine et al. |
| 2010/0191859 A1 | 7/2010 | Raveendran |
| 2010/0235733 A1 | 9/2010 | Drislane et al. |
| 2010/0235746 A1 | 9/2010 | Anzures |
| 2010/0287586 A1 | 11/2010 | Walter et al. |
| 2010/0306401 A1 | 12/2010 | Gilson |
| 2010/0332453 A1 | 12/2010 | Prahlad |
| 2011/0029874 A1 | 2/2011 | Profitt |
| 2011/0066703 A1 | 3/2011 | Kaplan et al. |
| 2011/0090402 A1 | 4/2011 | Huntington et al. |
| 2011/0119611 A1 | 5/2011 | Ahn et al. |
| 2011/0119711 A1 | 5/2011 | Marshall et al. |
| 2011/0119712 A1 | 5/2011 | Choi et al. |
| 2011/0242002 A1 | 10/2011 | Kaplan et al. |
| 2011/0252183 A1 | 10/2011 | Cho |
| 2011/0289139 A1 | 11/2011 | McIntosh et al. |
| 2011/0289534 A1 | 11/2011 | Jordan et al. |
| 2011/0296351 A1 | 12/2011 | Ewing et al. |
| 2012/0030619 A1 | 2/2012 | Lee et al. |
| 2012/0050616 A1* | 3/2012 | Andersson ......... H04N 21/2662 348/564 |
| 2012/0054679 A1 | 3/2012 | Ma et al. |
| 2012/0079429 A1 | 3/2012 | Stathacopoulos et al. |
| 2012/0131459 A1 | 5/2012 | llama-Vaquero et al. |
| 2012/0137216 A1 | 5/2012 | Choi |
| 2012/0141095 A1 | 6/2012 | Schwesinger et al. |
| 2012/0158802 A1 | 6/2012 | Lakshmanan et al. |
| 2012/0170903 A1 | 7/2012 | Shirron et al. |
| 2012/0180090 A1 | 7/2012 | Yoon et al. |
| 2012/0182384 A1 | 7/2012 | Anderson et al. |
| 2012/0204106 A1 | 8/2012 | Hill et al. |
| 2012/0213295 A1 | 8/2012 | Quere et al. |
| 2012/0216117 A1 | 8/2012 | Arriola et al. |
| 2012/0221950 A1 | 8/2012 | Chao et al. |
| 2012/0254793 A1 | 10/2012 | Briand et al. |
| 2012/0254926 A1 | 10/2012 | Takahashi et al. |
| 2012/0257120 A1 | 10/2012 | Nakai |
| 2012/0290933 A1 | 11/2012 | Rajaraman et al. |
| 2012/0311444 A1 | 12/2012 | Chaudhri |
| 2012/0323917 A1 | 12/2012 | Mercer et al. |
| 2013/0016129 A1 | 1/2013 | Gossweiler, III et al. |
| 2013/0061045 A1 | 3/2013 | Kiefer et al. |
| 2013/0080895 A1 | 3/2013 | Rossman et al. |
| 2013/0132605 A1 | 5/2013 | Kocks et al. |
| 2013/0145268 A1 | 6/2013 | Kukulski |
| 2013/0152129 A1 | 6/2013 | Alberth et al. |
| 2013/0179925 A1 | 7/2013 | Woods et al. |
| 2013/0222274 A1 | 8/2013 | Mori et al. |
| 2013/0236158 A1 | 9/2013 | Lynch et al. |
| 2013/0263047 A1 | 10/2013 | Allen et al. |
| 2013/0265501 A1 | 10/2013 | Murugesan et al. |

(56) References Cited

U.S. PATENT DOCUMENTS

| | | |
|---|---|---|
| 2013/0275924 A1 | 10/2013 | Weinberg et al. |
| 2013/0279375 A1 | 10/2013 | Newberg |
| 2013/0282917 A1 | 10/2013 | Reznik et al. |
| 2013/0283154 A1 | 10/2013 | Sasakura |
| 2013/0293454 A1 | 11/2013 | Jeon et al. |
| 2013/0305307 A1 | 11/2013 | Nagahama |
| 2013/0307792 A1 | 11/2013 | Andres et al. |
| 2013/0309986 A1 | 11/2013 | Cox et al. |
| 2013/0332835 A1 | 12/2013 | Mace |
| 2013/0346867 A1 | 12/2013 | Woods et al. |
| 2014/0032781 A1 | 1/2014 | Casey et al. |
| 2014/0059479 A1 | 2/2014 | Hamburg et al. |
| 2014/0082497 A1 | 3/2014 | Chalouhi et al. |
| 2014/0098140 A1 | 4/2014 | Tran et al. |
| 2014/0108929 A1 | 4/2014 | Garmark et al. |
| 2014/0114985 A1 | 4/2014 | Mok et al. |
| 2014/0143725 A1 | 5/2014 | Lee |
| 2014/0157124 A1 | 6/2014 | Roberts et al. |
| 2014/0164984 A1 | 6/2014 | Farouki |
| 2014/0176479 A1 | 6/2014 | Wardenaar |
| 2014/0178047 A1 | 6/2014 | Apodaca et al. |
| 2014/0185466 A1 | 7/2014 | Syed et al. |
| 2014/0215303 A1 | 7/2014 | Grigorovitch |
| 2014/0282281 A1 | 9/2014 | Ram et al. |
| 2015/0006662 A1 | 1/2015 | Braness |
| 2015/0089075 A1 | 3/2015 | Strigeus |

FOREIGN PATENT DOCUMENTS

| | | |
|---|---|---|
| EP | 2469841 A1 | 6/2012 |
| WO | WO 2004/019530 A1 | 3/2004 |
| WO | WO 2009/088952 A1 | 7/2009 |
| WO | WO 2011/095693 A1 | 8/2011 |
| WO | WO 2013/022486 A1 | 2/2013 |

OTHER PUBLICATIONS

Hoffert, Office Action U.S. Appl. No. 14/165,518, dated Feb. 11, 2016, 15 pgs.
Hoffert, Office Action U.S. Appl. No. 14/133,358, dated Mar. 3, 2016, 21 pgs.
Hoffert, Final Office Action U.S. Appl. No. 14/165,514, dated Jun. 1, 2016, 21 pgs.
Hoffert, Notice of Allowance U.S. Appl. No. 14/165,518, dated Jun. 7, 2016, 14 pgs.
Hoffert, Final Office Action U.S. Appl. No. 14/165,513, dated Aug. 11, 2016, 16 pgs.
Hoffert, Office Action U.S. Appl. No. 14/133,352, dated May 31, 2016, 23 pgs.
Hoffert, Office Action U.S. Appl. No. 14/135,225, dated Apr. 22, 2016, 25 pgs.
Hoffert, Office Action U.S. Appl. No. 14/743,694, dated Aug. 24, 2016, 6 pgs.
Spotify AB, International Preliminary Report on Patentability, PCTIB/2014/002831, dated Apr. 19, 2016, 8 pgs.
Spotify AB, Communication Pursuant to Rules 161(1) and 162, EP14828273-4, dated May 23, 2016, 2 pgs.
Spotifiy AB, Communication Pursuant to Rules 161(1) and 162, EP14831065.9, dated Jun. 3, 2016, 2 pgs.
Strigeus, Final Office Action, U.S. Appl. No. 14/135,217, dated May 20, 2016, 11 pgs.
Strigeus, Final Office Action, U.S. Appl. No. 14/135,230, dated Jun. 1, 2016, 16 pgs.
Hoffert, Office Action U.S. Appl. No. 14/165,513, dated Mar. 18, 2016, 17 pgs.
Hoffert, Final Office Action U.S. Appl. No. 14/133,340, dated Apr. 6, 2016, 21 pgs.
Hoffert, Office Action U.S. Appl. No. 14/134,950, dated Apr. 5, 2016, 17 pgs.
Hoffert, Office Action U.S. Appl. No. 14/805,323, dated Apr. 20, 2016, 6 pgs.
Hoffert, Office Action U.S. Appl. No. 14/743,684, dated Apr. 14, 2016, 7 pgs.
Hoffert, Final Office Action U.S. Appl. No. 14/165,508, dated Sep. 22, 2014, 24 pgs.
Hoffert, Office Action U.S. Appl. No. 14/165,508, dated Apr. 21, 2016, 17 pgs.
Hoffert, Final Office Action U.S. Appl. No. 14/165,514, dated Aug. 21, 2015, 20 pgs.
Hoffert, Office Action U.S. Appl. No. 14/165,514, dated Mar. 3, 2015, 19 pgs.
Hoffert, Final Office Action U.S. Appl. No. 14/165,514, dated Oct. 23, 2014, 23 pgs.
Hoffert, Final Office Action U.S. Appl. No. 14/165,513, dated Nov. 7, 2014, 14 pgs.
Hoffert, Office Action U.S. Appl. No. 14/165,513, dated Mar. 27, 2015, 16 pgs.
Hoffert, Office Action U.S. Appl. No. 14/165,514, dated May 9, 2014, 19 pgs.
Hoffert, Notice of Allowance U.S. Appl. No. 14/165,512, dated Mar. 2, 2015, 6 pgs.
Hoffert, Notice of Allowance U.S. Appl. No. 14/165,512, dated Oct. 14, 2014, 5 pgs.
Hoffert, Office Action U.S. Appl. No. 14/165,512, dated May 28, 2014, 19 pgs.
Hoffert, Final Office Action U.S. Appl. No. 14/165,517, dated Oct. 7, 2014, 7 pgs.
Hoffert, Office Action U.S. Appl. No. 14/165,517, dated May 28, 2014, 18 pgs.
Hoffert, Notice of Allowance, U.S. Appl. No. 14/165,517, dated Jan. 21, 2015, 6 pgs.
Hoffert, Notice of Allowance, U.S. Appl. No. 14/165,517, dated Apr. 28, 2015, 6 pgs.
Hoffert, Notice of Allowance, U.S. Appl. No. 14/165,507, dated Mar. 16, 2015, 17 pgs.
Hoffert, Final Office Action U.S. Appl. No. 14/165,507, dated Oct. 22, 2014, 20 pgs.
Hoffert, Office Action U.S. Appl. No. 14/165,507, dated May 14, 2014, 18 pgs.
Hoffert, Office Action U.S. Appl. No. 14/165,513, dated Jun. 6, 2014, 13 pgs.
Hoffert, Final Office Action U.S. Appl. No. 14/165,513, dated Jul. 16, 2015, 16 pgs.
Hoffert, Office Action U.S. Appl. No. 14/222,299, dated Jul. 3, 2014, 35 pgs.
Hoffert, Final Office Action U.S. Appl. No. 14/222,299, dated Nov. 28, 2014, 45 pgs.
Hoffert, Notice of Allowance U.S. Appl. No. 14/222,299, dated Apr. 13, 2015, 8 pgs.
Hoffert, Office Action U.S. Appl. No. 14/165,508, dated Jan. 5, 2015, 24 pgs.
Hoffert, Notice of Allowance, U.S. Appl. No. 14/165,508, dated Mar. 2, 2015, 7 pgs.
Hoffert, Office Action U.S. Appl. No. 14/133,333, dated Sep. 15, 2015, 20 pgs.
Hoffert, Office Action U.S. Appl. No. 14/133,340, dated Sep. 15, 2015, 19 pgs.
ISO/IEC 14496-12, Oct. 1, 2005, International Standard, ISO/IEC, XP55178146, 94 pgs.
Siglin, "Unifying Global Video Strategies, MP4 File Fragmentation for Broadcast, Mobile and Web Delivery," A Transitions in Technology White Paper, Nov. 16, 2011, 16 pgs.
Spotify AB, Invitation to Pay Additional Fees and Partial ISR, PCTUS2014/042571, dated Sep. 24, 2014, 6 pgs.
Spotify AB, International Search Report, PCTUS2014/042571, dated Dec. 12, 2014, 6 pgs.
Spotify AB, International Search Report and Written Opinion, PCTIB/2014/002831, dated Mar. 19, 2015, 11 pgs.
Spotify AB, Invitation to Pay Additional Fees and Partial Search Report, PCTIB/2014002726, dated Mar. 31, 2015, 8 pgs.
Spotify AB, International Search Report and Written Opinion, PCTIB/2014002726, dated Jun. 8, 2015, 20 pgs.
Strigeus, Office Action, U.S. Appl. No. 14/135,217, dated Aug. 26, 2015, 19 pgs.

(56) References Cited

OTHER PUBLICATIONS

Strigeus, Office Action, U.S. Appl. No. 14/135,230, dated Oct. 1, 2015, 15 pgs.

Zambelli, Alex, "IIS Smooth Streaming Technical Overview," Mar. 1, 2009, Microsoft Corporation, downloaded from http://dfpcorec-p.international.epo.org/wf/storage/14C3247F2EA000308DF/originalPdf, 8 pgs.

Hoffert, Notice of Allowance U.S. Appl. No. 14/165,518, dated Jan. 13, 2017, 17 pgs.

Hoffert, Office Action U.S. Appl. No. 14/133,333, dated Jan. 27, 2017, 22 pgs.

Hoffert, Office Action U.S. Appl. No. 14/133,340, dated Jan. 18, 2017, 21 pgs.

Hoffert, Final Office Action U.S. Appl. No. 14/133,352, dated Dec. 1, 2016, 26 pgs.

Hoffert, Notice of Allowance, U.S. Appl. No. 14/133,352, dated Mar. 28, 2017, 24 pgs.

Hoffert, Notice of Allowance, U.S. Appl. No. 14/133,358, dated Oct. 25, 2016, 10 pgs.

Hoffert, Notice of Allowance U.S. Appl. No. 14/134,950, dated Oct. 3, 2016, 10 pgs.

Hoffert, Notice of Allowance, U.S. Appl. No. 14/805,323, dated Oct. 3, 2016, 9 pgs.

Hoffert, Notice of Allowance, U.S. Appl. No. 14/743,684, dated Sep. 23, 2016, 8 pgs.

Hoffert, Final Office Action U.S. Appl. No. 14/135,225, dated Oct. 7, 2016, 33 pgs.

Hoffert, Office Action U.S. Appl. No. 14/720,525, dated Aug. 22, 2016, 17 pgs.

Hoffert, Notice of Allowance U.S. Appl. No. 14/720,525, dated Jan. 31, 2017, 8 pgs.

Hoffert, Notice of Allowance, U.S. Appl. No. 14/743,694, dated Dec. 19, 2016, 5 pgs.

Strigeus, Office Action, U.S. Appl. No. 14/135,217, dated Jan. 9, 2017, 6 pgs.

Strigeus, Office Action, U.S. Appl. No. 14/135,230, dated Nov. 3, 2016, 15 pgs.

Strigeus, Notice of Allowance, U.S. Appl. No. 14/135,230, dated Mar. 23, 2017, 8 pgs.

Hoffert, Final Office Action U.S. Appl. No. 14/133,333, dated Jul. 3, 2017, 20 pgs.

Hoffert, Office Action U.S. Appl. No. 14/135,225, dated May 30, 2017, 12 pgs.

Strigeus, Notice of Allowance, U.S. Appl. No. 14/135,217, dated May 24, 2017, 9 pgs.

* cited by examiner

SYSTEM AND METHOD FOR SWITCHING BETWEEN MEDIA ITEMS IN A PLURALITY OF SEQUENCES OF MEDIA ITEMS

RELATED APPLICATIONS

This application is a continuation of U.S. application Ser. No. 14/222,299, filed Mar. 21, 2014 which claims priority to U.S. Provisional Patent Application Ser. No. 61/892,343, filed Oct. 17, 2013, entitled "System and Method for Switching between Media Items in a Plurality of Sequences of Media Items," which applications are incorporated by reference in their entireties.

This application is related to U.S. Provisional Patent Application Ser. No. 61/836,079, filed Jun. 17, 2013, entitled "System and Method for Switching Between Media Streams while Providing a Seamless User Experience;" U.S. Provisional Patent Application Ser. No. 61/861,330, filed Aug. 1, 2013, entitled "Transitioning from Decompressing One Compressed Media Stream to Decompressing another Media Stream;" U.S. Provisional Patent Application Ser. No. 61/881,353, filed Sep. 23, 2013, entitled "System and Method for Efficiently Providing Media and Associated Metadata," which applications are incorporated by reference in their entireties.

TECHNICAL FIELD

The disclosed implementations relate to presenting media content generally and switching between media streams in particular.

BACKGROUND

As computer technology has improved and become ubiquitous, users increasingly are able to use computer based devices to consume media content. For example, users can listen to audio content or watch video content on a variety of computer based electronic devices that are not receiving a predefined set of channels being broadcast to multiple devices (e.g., via radio, broadcast television or cable). In addition, advances in network technology have increased the speed and reliability with which information can be transmitted over computer networks to individual computers. As such, it is possible to select particular media items to play over computer networks as needed rather than tuning in to a particular channel of a predefined broadcast transmission.

SUMMARY

Despite the advances in networking speed and reliability, some solutions for switching between different media items are cumbersome and involve multiple steps that can be confusing and frustrating for a user. This is especially true when a user has to perform searches or navigate through menus and indexes to identify media items to play. In such circumstances, a user is less likely to switch between different media items while viewing media items on a device due to the inconvenience of doing so, thereby reducing the user's enjoyment of and satisfaction with the device.

Accordingly, there is a need for a method to reduce the time needed to switch between media items to provide a seamless user experience that enables a user to easily and intuitively switch between media items in a first sequence of media items and media items in different sequences of media items based on a direction of motion of an input. Such methods and interfaces may complement or replace conventional methods for switching between media items. Such methods and interfaces enhance the user experience, as the user is able to switch between media items quickly. In particular, users watching media items will be able to browse through different sequences of media items easily and intuitively.

In accordance with some implementations, a method for switching between media items is disclosed. The method is performed at an electronic device with one or more processors, memory, and a display. The electronic device obtains information about a plurality of sequences of media items, including a first sequence of media items and a second sequence of media items that is different from the first sequence of media items, and plays an initially-displayed media item of the first sequence of media items on a display. While playing the initially-displayed media item in a respective region of the display, the electronic device detects a media-change input. In response to detecting the media-change input, in accordance with a determination that the media-change input corresponds to movement in a first direction, the electronic device ceases to play the initially-displayed media item in the respective region of the display and plays a first media item in the respective region of the display. The first media item is different from the respective media item and is sequentially adjacent to the initially-displayed media item in the first sequence of media items. In accordance with a determination that the media-change input corresponds to movement in a second direction that is different from the first direction, the electronic device ceases to play the initially-displayed media item in the respective region of the display and plays a second media item in the respective region of the display, where the second media item is different from the initially-displayed media item and the first media item and is from the second sequence of media items.

In accordance with some implementations, a computer system (e.g., a client system or server system) includes one or more processors, memory, and one or more programs; the one or more programs are stored in the memory and configured to be executed by the one or more processors and the one or more programs include instructions for performing the operations of the method described above. In accordance with some implementations, a non-transitory computer readable storage medium has stored therein instructions which when executed by one or more processors, cause a computer system (e.g., a client system or server system) to perform the operations of the methods described above.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1A:
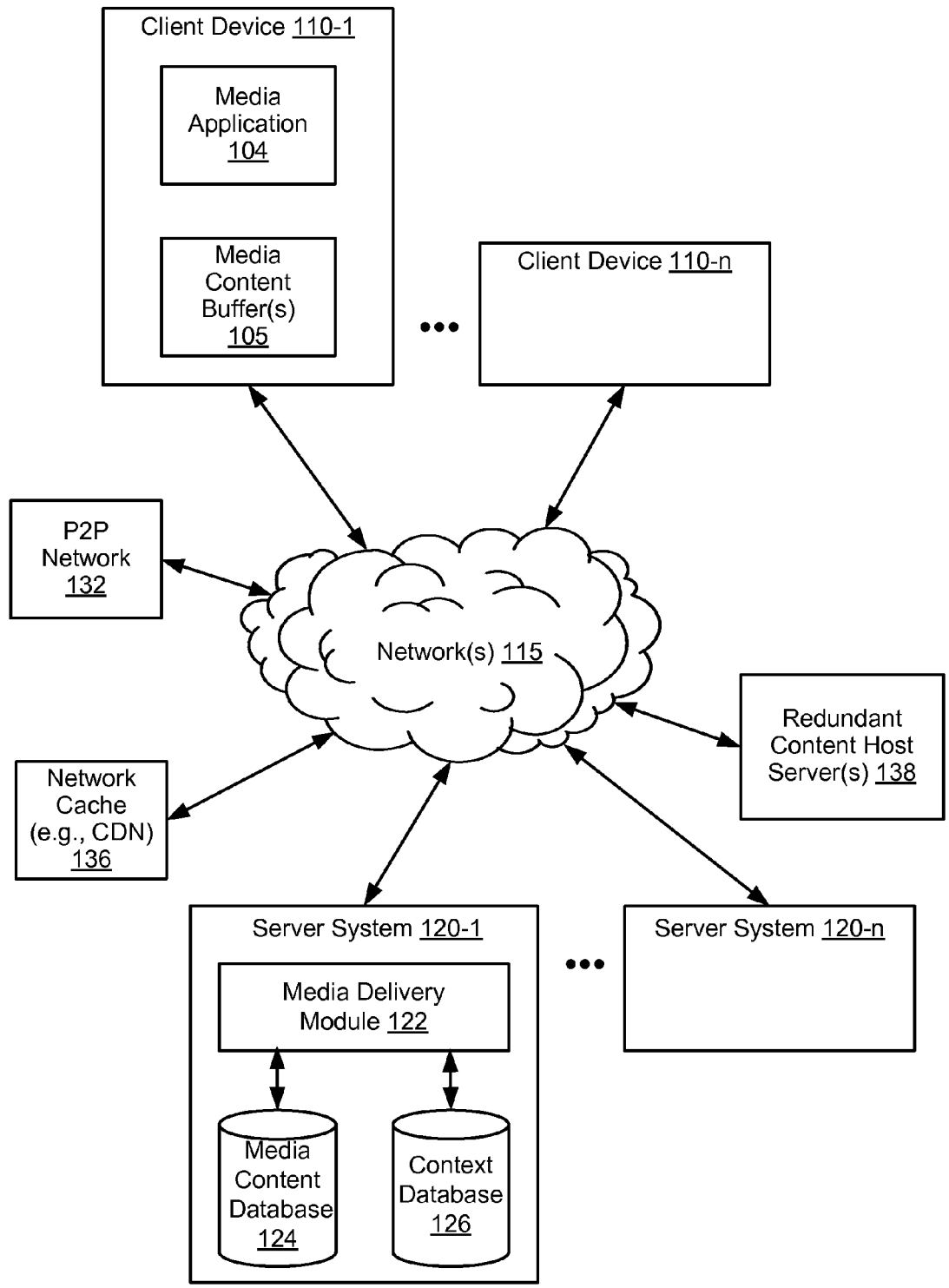
FIG. 1A is a block diagram illustrating a client-server environment in accordance with some implementations.

FIG. 1A is a block diagram of a client-server environment 100 in accordance with some implementations. Client-server environment 100 includes one or more client devices (110-1, . . . , 110-*n*) and one or more server systems (120-1, . . . , 120-*n*) that are connected through one or more networks 115. Client-server environment 100 also, optionally, includes a peer-to-peer (P2P) network 132 of clients (e.g., client applications and/or client devices) that share files with each other (e.g., via network 115), a network cache 136 (e.g., including one or more content delivery network (CDN) servers), and one or more redundant content host servers 138 (e.g., media servers) connected to one or more networks 115.

Client device 110-1 in FIG. 1A is a representative electronic device associated with a respective user. Server system 120-1 in FIG. 1A is a representative server associated with a media content provider with which users (and their electronic devices), optionally, have accounts that enable the users to access media content from one or more of server systems 120. One or more networks 115 can be any network such as the Internet, other Wide Area Networks, Local Area Networks, Personal Area Networks, metropolitan area networks, VPNs, peer-to-peer, ad-hoc connections, and so on.

In some implementations, client device 110-1 is one of the group of: a personal computer, a mobile electronic device, a wearable computing device, a laptop, a tablet computer, a mobile phone, a digital media player, or any other electronic device able to prepare media content for presentation, control presentation of media content, and/or present media content. For example, server system 120-1 is operated and/or provided by a subscription-based media streaming service to which a user, optionally, has an account associated with account credentials that enable client device 110-1 to communicate with and receive content from content sources such as server system 120-1, P2P network 132, network cache 136, and/or redundant content host server(s) 138.

In some implementations, client device 110-1 includes a first electronic device (e.g., a controlling electronic device) and a second electronic device (e.g., a controlled electronic device), and both the first electronic device and the second electronic device are associated with a common user account (or associated user accounts) provided by a content provider with which server system 120-1 is associated. The first electronic device (e.g., a personal computer or a set top box) is optionally associated with account credentials and receives content from server system 120-1, and the second electronic device is a media presentation device (e.g., a set of speakers, a display, a television set, etc.) that receives the content from the first electronic device and presents that content to the user.

In some implementations, client device 110-1 includes a media content presentation and control application 104 (hereinafter "media application"). Media application 104 is able to control the presentation of media by client device 110-1. For example, media application 104 enables a user to navigate media content items, select media content items for playback on client device 110-1, select media streams for presentation, change currently displayed media streams, create and edit playlists, and other such operations.

In some implementations, media content is stored by client device 110-1 (e.g., in a local cache such as a media content buffer 105 and/or in permanent storage at client device 110-1). In some implementations, the media content is stored by a server system 120-1 (e.g., an origin server), which is located remotely from client device 110-1. In some implementations, the media content is stored by one or more computing devices in media delivery system 150, discussed in more detail below with reference of FIG. 1B. Media delivery system 150 includes peer-to-peer (P2P) network 132, network cache 136, and one or more redundant content host servers 138. The media content is then sent (or streamed) from one or more of the computing devices in media delivery system 150 to client device 110-1 over one or more networks 115. As used herein, media content is streamed from a source to a destination by transmitting data corresponding to the media content from the source to the destination over time where a computer at the destination can perform operations on the media content before the media content has been completely received (e.g., a first portion of the media content is received from the source and can be played before a second, later, portion of the media content is received from the source).

In some implementations, the data sent from (or streamed from) server system 120-1 is stored/cached by client device 110-1 in a local cache such as one or more media content buffers 105 in the memory of client device 110-1. Media content stored in media content buffer(s) 105 is, typically, removed after the media content is presented by client device 110-1, allowing new media content data to be stored in media content buffer 105. At least some of the media content stored in media content buffer(s) 105 is, optionally, retained for a predetermined amount of time after the content is presented by client device 110-1 and/or until other predetermined conditions are satisfied For example the content is stored until the content has been presented by the client device, the content corresponding to a media tile is stored until the media corresponding to the media tile has reached an end of the content (e.g., an end of a movie/ television show or sporting event), or the content corresponding to a first media tile is stored until the client device switches to playing content corresponding to a second media tile to enable the user to play the content corresponding to the first media tile again without re-downloading the content (e.g., in response to activation of a "play again" or "replay" affordance in a media player user interface). Media content buffer 105 is configured to store media content from more than one media content stream. Storing data in a buffer while it is being moved from one place to another (e.g., temporarily storing compressed data received from a content source before it is processed by a codec and/or temporarily storing decompressed data generated by a codec before it is rendered by a renderer) is sometimes referred to as "buffering" data, and data stored in this way is sometimes referred to a "buffered" data. "Buffered" data is typically, but optionally, removed (or marked for deletion) from the buffer in which it was stored after it is transmitted from the buffer to its destination (e.g., a codec or a renderer), rather than being stored for later use.

In some implementations, when client device 110-1 includes a first electronic device and a second electronic device, media application 104 (e.g., on a set top box) is also able to control media content presentation by the second electronic device (e.g., a set of speakers or a television set or other display connected to the set top box), which is distinct from the first electronic device. Thus, in some circumstances, the user is able to use media application 104 to cause the first electronic device to act both as a media presentation device as well as a remote control for other media presentation devices. This enables a user to control media presentation on multiple electronic devices from within media application 104 and/or using a single user interface.

When a user wants to playback media on client device 110-1, the user is enabled to interact with media application 104 to send a media control request to server system 120-1. Server system 120-1 receives the media control request over one or more networks 115. For example, the user is enabled to press a button on a touch screen of client device 110-1 in order to send the media control request to server system 120-1. As described below, a media control request is, for example, a request to begin presentation of media content by client device 110-1. Though often used herein to describe requests to initiate or begin presentation of media by client device 110-1, media control requests optionally also include requests and/or signals to control other aspects of the media that is being presented on client device 110-1, including but not limited to commands to pause, skip, fast-forward, rewind, seek, adjust volume, change the order of items in a playlist, add or remove items from a playlist, adjust audio equalizer settings, change or set user settings or preferences, provide information about the currently presented content, begin presentation of a media stream, transition from a current media stream to another media stream, and the like. In some implementations, media controls control what content is being delivered to client device 110-1 (e.g., if the user pauses playback of the content, delivery of the content to client device 110-1 is stopped). However, the delivery of content to client device 110-1 is, optionally, not directly tied to user interactions with media controls. For example, while the content that is delivered to client device 110-1 is selected based on a user request for particular content by the user, the content optionally continues to be delivered to client device 110-1 even if the user pauses playback of the content (e.g., so as to increase an amount of the content that is buffered and reduce the likelihood of playback being interrupted to download additional content). In some implementations, if user bandwidth or data usage is constrained (e.g., the user is paying for data usage by quantity or has a limited quantity of data usage available), client device 110-1 ceases to download content if the user has paused or stopped the content, so as to conserve bandwidth and/or reduce data usage.

Client-server environment 100 in FIG. 1A also includes a representative server system 120-1 that includes a media delivery module 122, a media content database 124, and a context database 126. Media content database 124 stores media content that is configured to be provided to and presented by client device 110-1 and/or provided to Network Cache 136, clients in a P2P Network 132, or other content sources. For example, media content database 124 stores audio (e.g., music, audio books, etc.), video (e.g., movies, television shows, etc.), images, or other media content that can be sent to (or streamed to) other client devices. Media content database 124 optionally includes data in different formats and file types to allow a variety of different devices and/or applications to receive content. In some implementations, server system 120-1 includes a media delivery module 122 (e.g., a media streaming module) that receives a media control request from a respective client device (e.g., client device 110-1). In response to receiving the media control request, media delivery module 122 sends (e.g., streams) media content to a client device as requested.

In some circumstances, the received media control request includes information identifying the client device (e.g., an IP address) to which server system 120-1 should forward the media control request. For example, a user, optionally, has multiple client devices that can present media received from server system 120-1, such as a mobile phone, a computer system, a tablet computer, a television, a home stereo, etc. The identifying information optionally includes a unique or semi-unique device identifier, such as an IP address, a Media Access Control (MAC) address, a user-specified device name, an International Mobile Equipment Identity (IMEI) number, or the like. Accordingly, the media control request will identify that a request is intended for the home stereo, for example, so that server system 120-1 can send the requested media and/or the media control request to the home stereo. Client device 110-1 optionally provides server system 120-1 with an indication of device capabilities of the device such as screen resolution, processing speed, video buffer size/availability, available bandwidth, target/desired bandwidth, codec availability, and the like, and the server system provides content to the electronic device in accordance with the device capabilities.

In some implementations, server system 120-1 includes a context database 126. Context database 126 stores data associated with the presentation of media content by client device 110-1 that includes, among other things, the current position in a media content stream that is being presented by client device 110-1, a playlist associated with the media content stream, previously played content, skipped pieces of media content, and previously indicated user preferences. For example, context database 126, optionally, includes information that a content stream to client device 110-1 currently is presenting a song, at 1 minute and 23 seconds into the song, as well as all the songs played in the last hour and the next 20 songs in the playlist. In some circumstances, server system 120-1 transmits the context associated with a media content stream to client device 110-1 that is presenting the content stream so that one or more items of context information can be used by client device 110-1, such as for display to the user. When the client device to which the media content is being streamed changes (e.g., from client device 110-1 to client device 110-*n*), server system 120-1 transmits the context associated with the active media content to the newly active client device (e.g., client device 110-*n*).

Figure 1B:
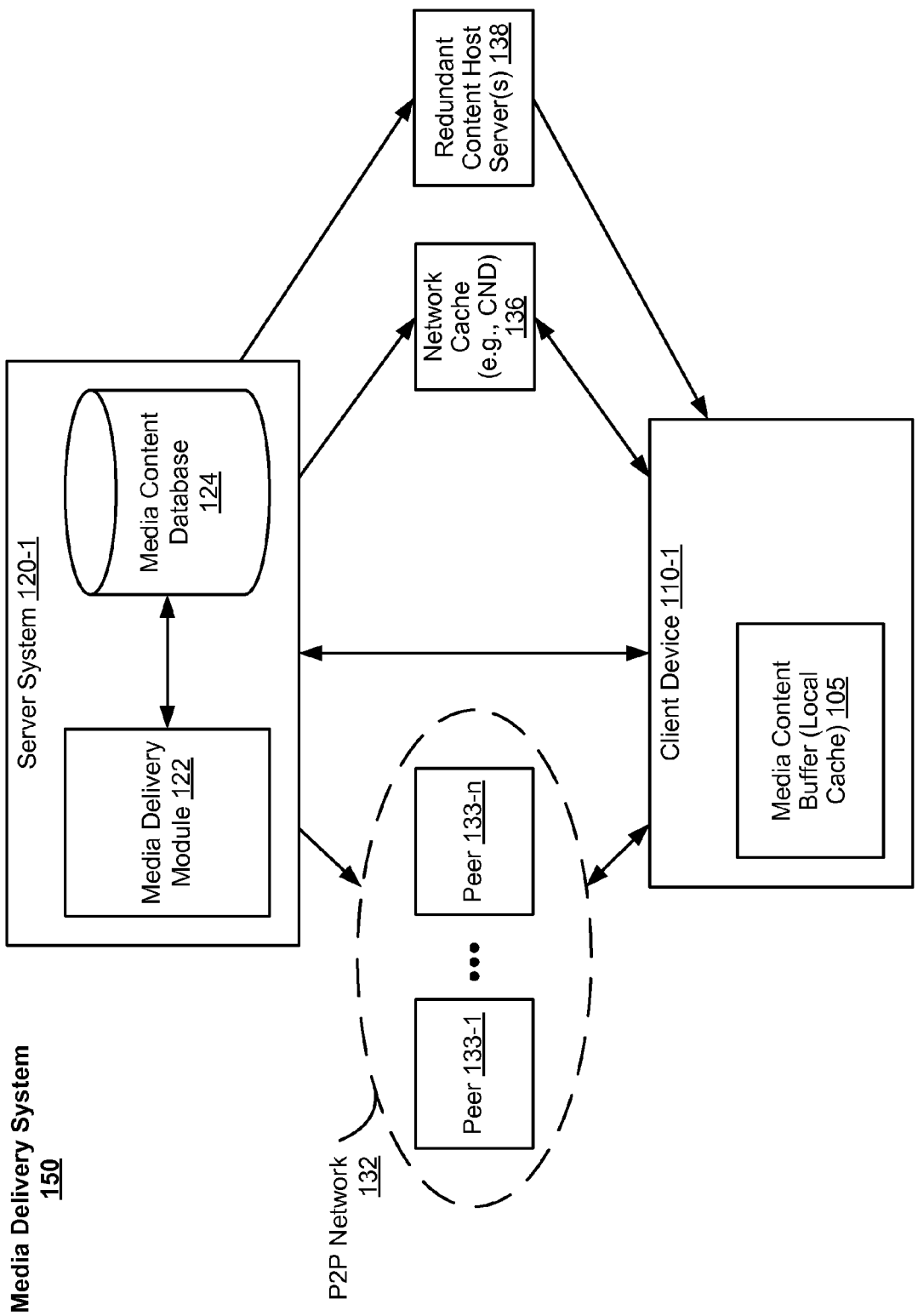
FIG. 1B is a block diagram illustrating a media delivery system in accordance with some implementations.

FIG. 1B is a block diagram of a media delivery system 150 in accordance with some implementations. Media delivery system 150 in FIG. 1B includes a plurality of computing devices including one or more of a client device 110-1 with a local cache such as a media content buffer 105, one or more server systems 120 (sometimes also herein called origin servers) with a media delivery module 122 and a media content database 124 and/or access to a media content database 124, a peer-to-peer (P2P) network 132 including one or more peers (133-1, . . . , 133-*n*), a network cache 136, and one or more redundant content host servers 138. Media content is optionally stored at one or more of the computing devices in media delivery system 150. For example, media content is initially stored in media content database 124 of server system 120 and subsequently disseminated/distributed to one or more peers 133 in P2P network 132, network cache 136, and/or one or more redundant content host servers 138 for access by client device 110-1.

When client device 110-1 sends a media control request to server system 120-1 for media content, server system 120-1 (e.g., media delivery module 122) responds to the request by utilizing source information to instruct one or more of the computing devices in media delivery system 150 to send media content associated with the media control request to client device 110-1 as requested or sends relevant source information to client device 110-1 that enables client device 110-1 to request the media content associated with the media control request from a source (e.g., P2P network 132, network cache 136, and/or redundant content host servers 138). Client device 110-1 optionally obtains media content associated with the media control request from a local cache such as media content buffer 105. Client device 110-1 optionally utilizes locally stored source information to request or obtain media content associated with the media control request from one or more computing devices in media delivery system 150 (e.g., P2P network 132, network cache 136, or redundant content host servers 138).

Figure 2:
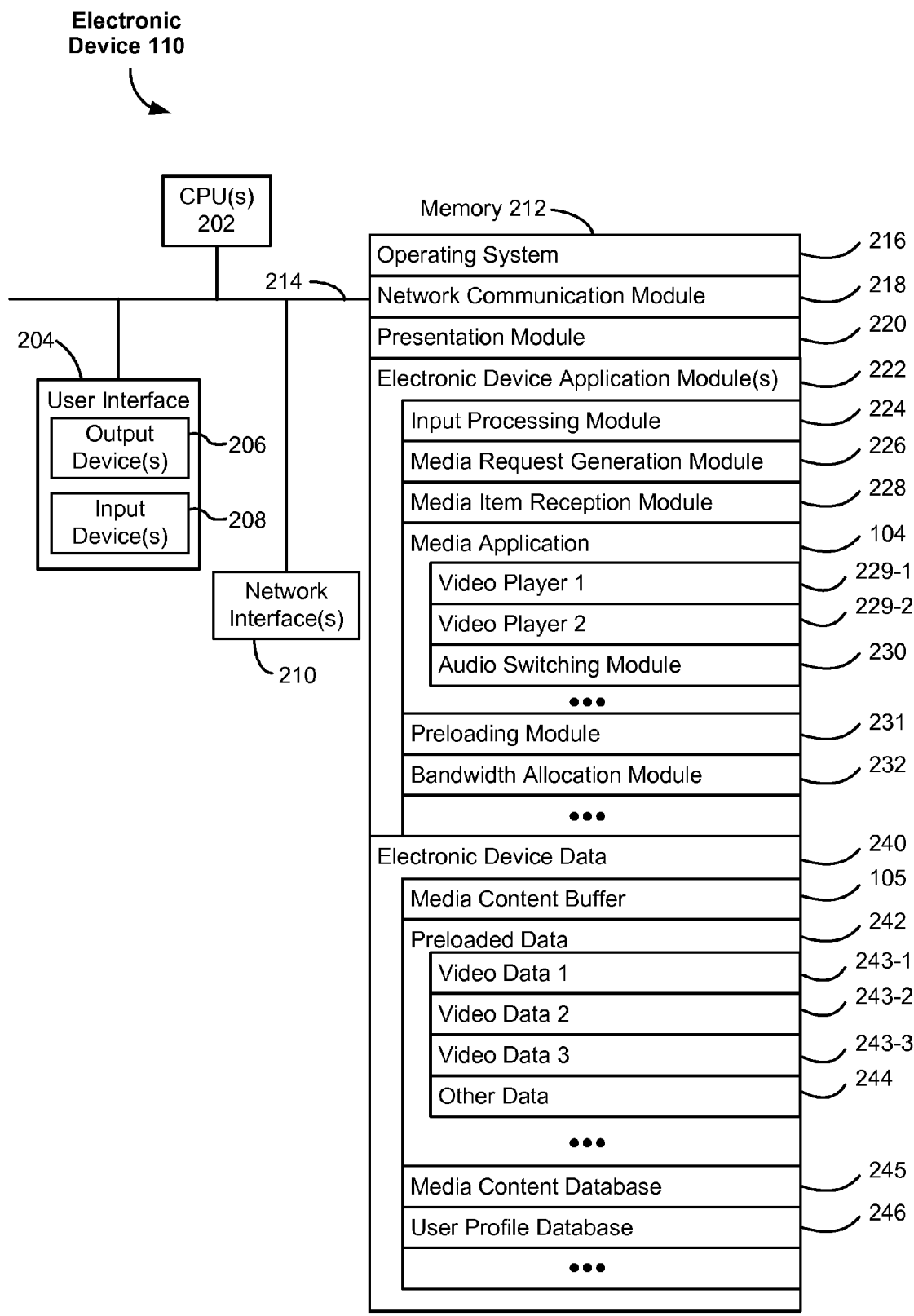
FIG. 2 is a block diagram illustrating an electronic device in accordance with some implementations.

FIG. 2 is a block diagram illustrating an electronic device 110, in accordance with some implementations. The electronic device 110 typically includes one or more processing units (CPUs) 202, one or more network interfaces 210, memory 212, and one or more communication buses 214 for interconnecting these components. The electronic device 110 includes a user interface 204. The user interface 204 includes output device(s) 206, including user interface elements that enable output 206 to be presented to a user, including via speakers or a visual display. The user interface 204 includes input device(s) 208, including user interface components that facilitate user input such as a keyboard, a mouse, a voice-command input unit, a touch sensitive display, a touch-sensitive input pad, a gesture capturing camera, or other input buttons. In some implementations, the electronic device 110 is a wireless device, such as a mobile phone or a tablet computer. Furthermore, some client systems 101 use a microphone and voice recognition or a camera and gesture recognition to supplement or replace the keyboard. Memory 212 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 212 optionally includes one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules, and data structures, or a subset thereof:

- an operating system 216 that includes procedures for handling various basic system services and for performing hardware dependent tasks;
- a network communication module 218 that is used for connecting the electronic device 110 to other computers via the one or more communication network interfaces 210 (wired or wireless) and one or more communication networks, such as the Internet, other Wide Area Networks, Local Area Networks, Personal Area Networks, metropolitan area networks, VPNs, peer-to-peer and/or ad-hoc connections, and so on;
- a presentation module 220 for enabling presentation of media content at the electronic device 110 through the output devices 206 associated with the user interface 204 (e.g., screens, speakers, headphones, etc.);
- one or more client system applications module(s) 222 for enabling the electronic device 110 to perform the functions offered by the client system 110, the application module(s) 222 including but not limited to:
  - an input processing module 224 for receiving input from a user through an input device 208 and interpreting the received input;
  - a media request generation module 226 for generating a request for media items (e.g., media stream data) based on input received from the input processing module 224;
  - a media item reception module 228 for receiving one or more media items (e.g., media streams) from a media source (e.g., a media streaming server) that is remote from the electronic device 110;
  - a media application 104 for processing media items (e.g., media streams) for transmittal to an output device 206 and transmitting at least one of the prepared media items (e.g., media streams) to the presentation module 220 for transmittal to an output device 206, the media application including:
    - a first video player 229-1 for de-multiplexing, decrypting, decompressing, decoding, and/or rendering a first media item for storage in a media content buffer 105 before transmittal to an output device 206;
    - a second video player 229-2 for de-multiplexing, decrypting, decompressing, decoding, and/or rendering a second media item, distinct from the first media item, for storage in a media content buffer 105 before transmittal to an output device 206; and
    - an audio switching module 230 for, in response to receiving a request to display a video other than the currently displayed video, determining audio data associated with the requested video; and changing the audio data currently being presented to match the newly requested video steam;
  - a preloading module 231 for determining, based on the media item currently displayed and/or the available bandwidth, one or more media items that need to be preloaded, and receiving media item data for the determined one or more media items, and suspending the delivery of the one or more media items; and
  - a bandwidth allocation module 232 for allocating the total download bandwidth when the electronic device 110 is downloading more than one media item;
- an electronic device data module 240 for storing data, including but not limited to:
  - media content buffer(s) 105 including media item content data received from a server system (e.g., server system 120, FIG. 1) for one or more media items and stored in the memory of the electronic device 110;
  - preloaded data 242 including but not limited to, audio and/or video data from one or more media items, received from the appropriate media content server such as Video Data 1 243-1, Video Data 2 243-2 (e.g., video data for Video Stream B 402 in FIGS. 4A-4H), Video Data 3 243-3 (e.g., video data for Video Stream C 404 in FIGS. 4A-4H) and, optionally, Other Data 244 such as still frames, audio data, and/or metadata from one or more other video streams;
  - media content database 245 for storing, on the local device, media content that is part of the user's personal library of media content; and
  - a user profile database 246 including account information for a user of the electronic device 110 including user media history, user preferences, determined user interests, and account credentials.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. Memory 212 optionally stores a subset of the modules and data structures identified above. Furthermore, Memory 212 optionally stores additional modules and data structures not described above.

Figure 3:
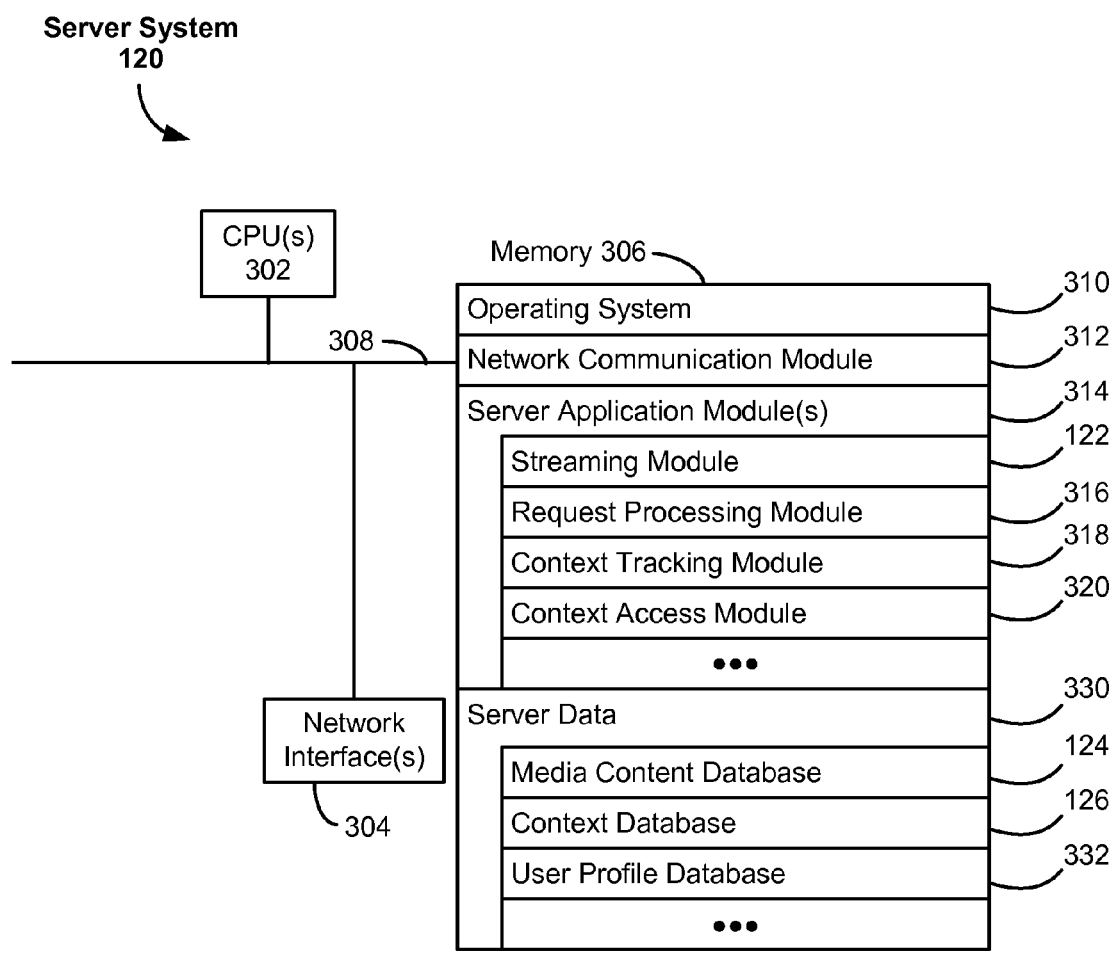
FIG. 3 is a block diagram illustrating a server system in accordance with some implementations.

FIG. 3 is a block diagram illustrating a server system 120, in accordance with some implementations. The server system 120 typically includes one or more processing units (CPUs) 302, one or more network interfaces 304, memory 306, and one or more communication buses 308 for interconnecting these components. Memory 306 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the server system 120 to other computers via the one or more communication network interfaces 304 (wired or wireless) and one or more communication networks, such as the Internet, other Wide Area Networks, Local Area Networks, Personal Area Networks, metropolitan area networks, VPNs, and so on;
- one or more server application module(s) 314 for enabling the server system 120 to perform the functions offered by the server system 120, including but not limited to:
  - a media delivery module 122 for delivering (e.g., streaming) media content to an electronic device 110 remote from the sever system 120;
  - a request processing module 316 for receiving requests from electronic devices 110, where the requests include requests to provide specific media items to the electronic devices and/or requests to change the destination of the media item from one electronic device to another electronic device;
  - a context tracking module 318 for tracking and storing the context of a media item, optionally including storing, among other data, one or more of the current playback position in a media item that is currently being presented by an electronic device 110, the position in a current playlist, the play history of a user, the preferences of a user, previously skipped media content, whether media content items were "liked" or "disliked" (e.g., via "starred," "thumbs-up," and/or "thumbs-down" indications), and the like; and
  - a context access module 320 for allowing electronic devices 110 associated with a given user account to access the current context for media items associated with the given user account; and
- one or more server data module(s) 330 for storing data related to the data server system 120, including but not limited to:
  - media content database 124 including media content and metadata describing the media content and enabling clients to search through the media content to identify media content;
  - a context database 126 including information associated with one or more media, where context information optionally includes one or more of the current playback position in a media item, metadata relating to the media, a position in a playlist, play history of a user, user preferences, skipped media, and user settings; and
  - a user profile database 332 including account information for a plurality of users, where the account information for a respective user optionally includes a user media content request/playback history for the respective user, a list of electronic devices associated with the respective user, user preferences of the respective user, and determined user interests of the respective user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. Memory 306 optionally stores a subset of the modules and data structures identified above. Furthermore, Memory 306 optionally stores additional modules and data structures not described above.

Although FIG. 3 shows a "Server System" 120, FIG. 3 is intended more as a functional description of the various features which may be present in a set of servers than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a Server System 120 and how features are allocated among them will vary from one implementation to another, and optionally depends in part on the amount of data traffic that the system must handle during peak usage periods as well as during average usage periods.

Attention is now directed towards implementations of user interfaces ("UI") and associated processes that are, optionally, implemented on an electronic device with a display and a touch-sensitive surface, such as electronic device 110. FIGS. 4A-4H and 5A-5O illustrate exemplary user interfaces for switching between media items in accordance with some implementations. The user interfaces in these figures are used to illustrate the processes described below, including the processes in FIGS. 6 and 7.

Figure 4A:
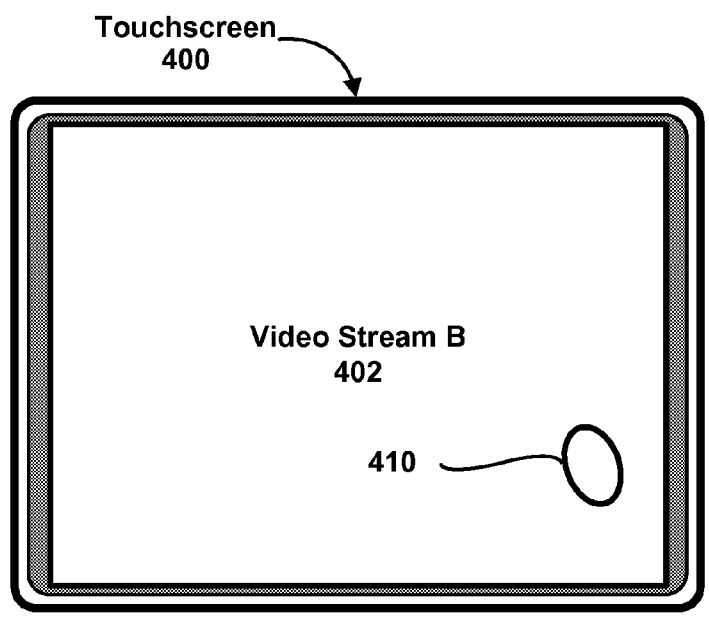
FIGS. 4A-4H illustrate example controls for controlling a user interface in accordance with some implementations.
Figure 4B:
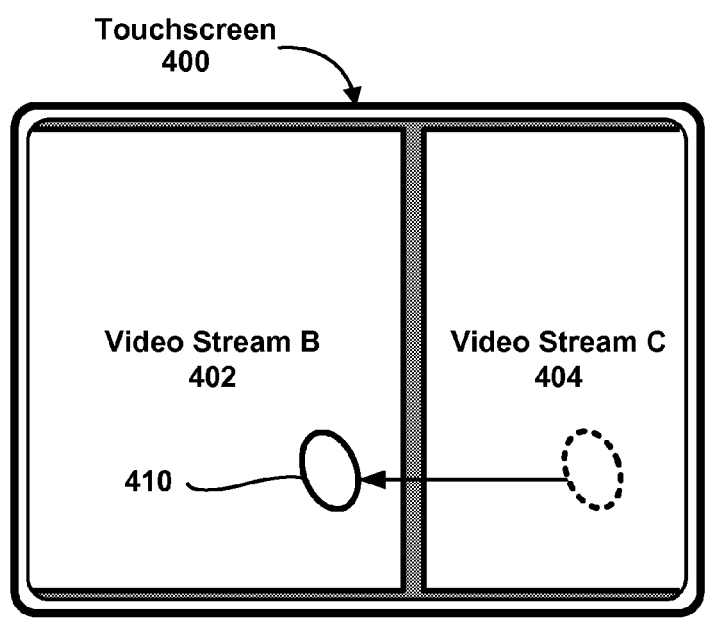

Attention is now directed towards FIGS. 4A-4B, which illustrate a touch screen 400 of an electronic device (e.g., 110 in FIGS. 1A-1B and 2). In FIGS. 4A-4B, a user controls the device by performing gestures with one or more contacts on touchscreen 400. For example in FIG. 4A, the device detects contact 410 on touchscreen 400 and in FIG. 4B, the device detects movement of contact 410 to the left on touchscreen 400 and navigates through the user interface by sliding a video tile that corresponds to Video Stream B 402 off of touchscreen 400 to the left and sliding a video tile that corresponds to Video Stream C 404 onto touchscreen 400 from the right.

Figure 4C:
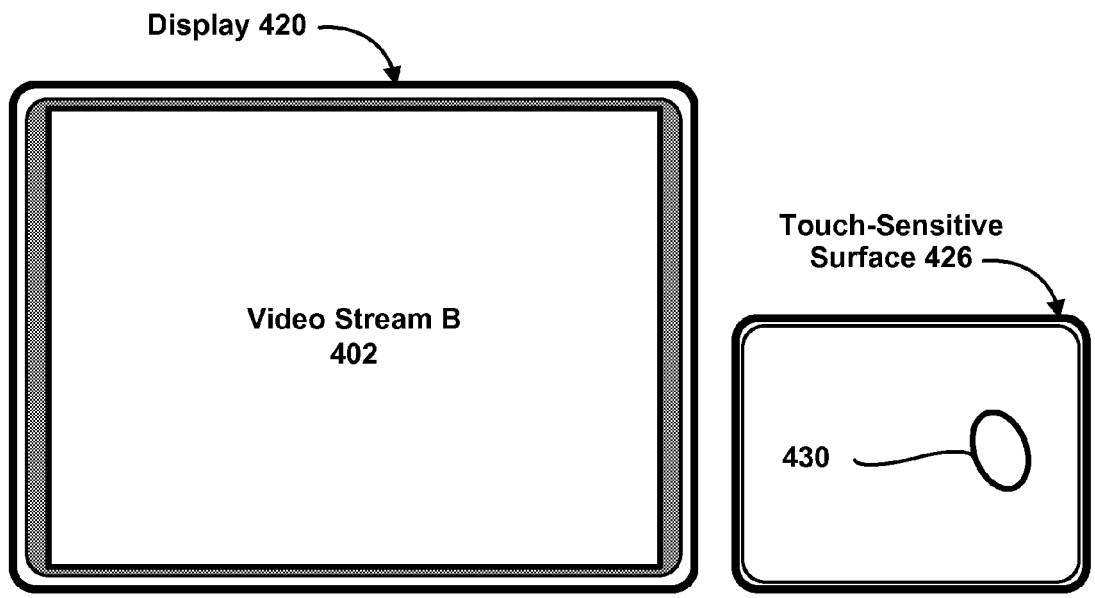
Figure 4D:
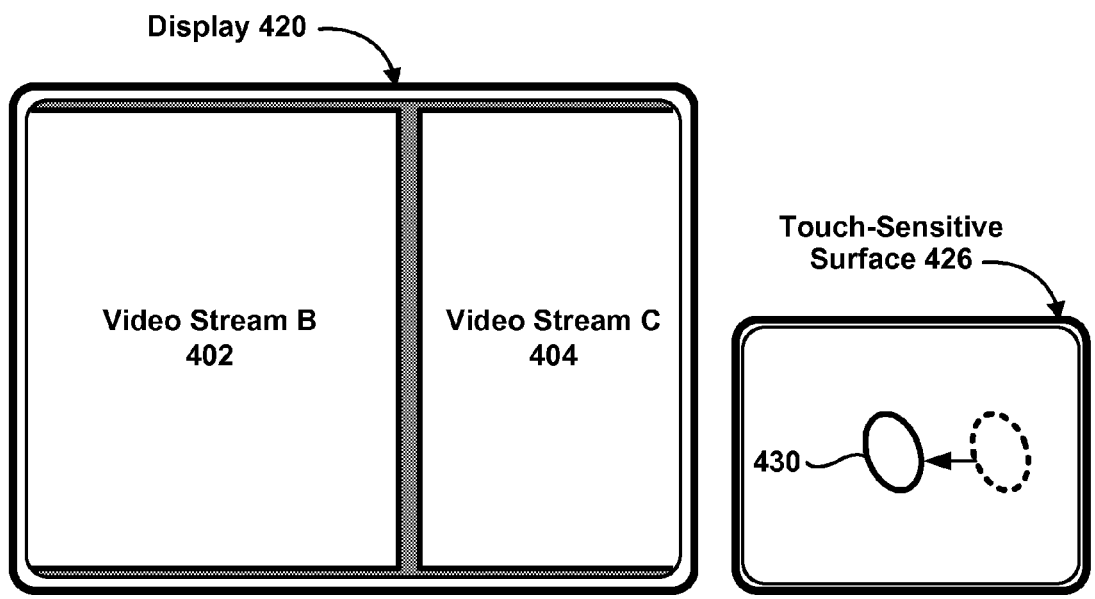

Attention is now directed towards FIGS. 4C-4D, which illustrate a display 420 and a separate touch-sensitive surface 426 of an electronic device (e.g., 110 in FIGS. 1A-1B and 2). In FIGS. 4C-4D, a user controls the device by performing gestures with one or more contacts on touch-sensitive surface 426. For example in FIG. 4C, the device detects the contact 430 on the touch-sensitive surface 426 and in FIG. 4D, the device detects movement of the contact 430 to the left on the touch-sensitive surface 426 and navigates through the user interface by sliding a video tile that corresponds to Video Stream B 402 off of display 420 to the left and sliding a video tile that corresponds to Video Stream C 404 onto display 420 from the right. It should be understood that any inputs described herein as corresponding to a contact and movement of the contact on a touch-screen could also be performed in an analogous manner with movements of a contact on a separate touch-sensitive surface.

Figure 4E:
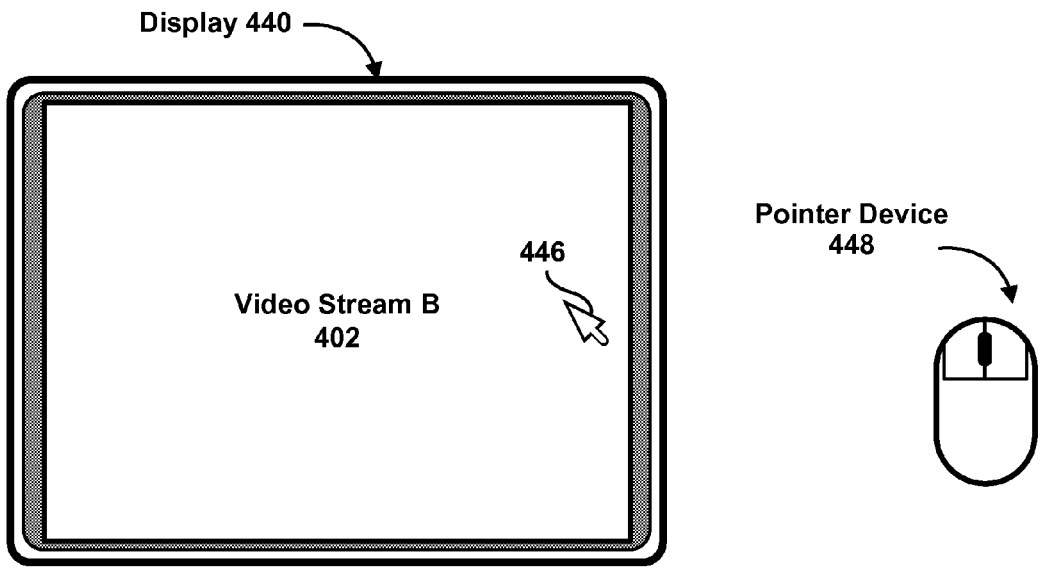
Figure 4F:
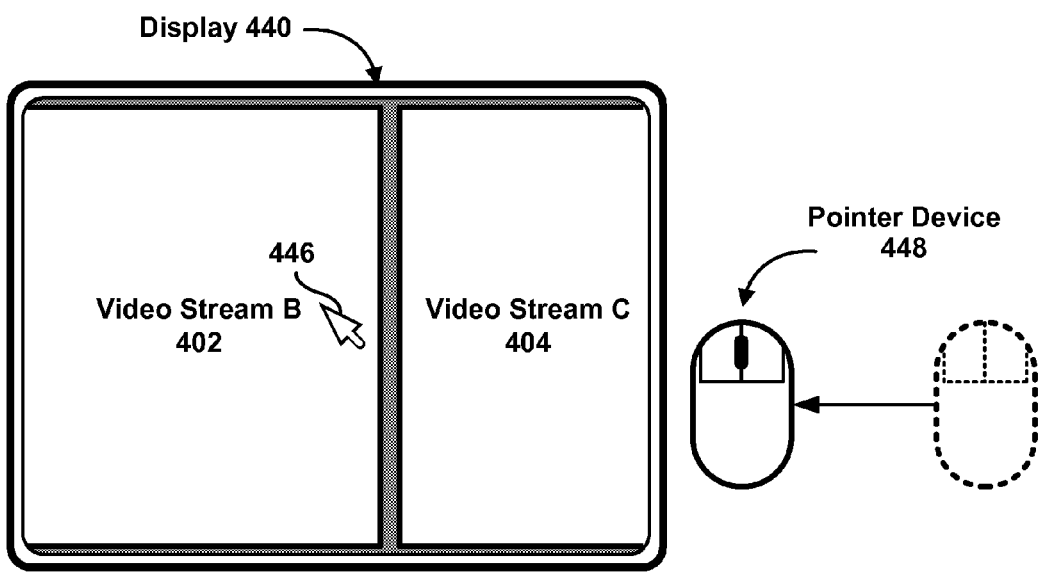

Attention is now directed towards FIGS. 4E-4F, which illustrate a display 420 and a separate pointer device 448 of an electronic device (e.g., 110 in FIGS. 1A-1B and 2). In FIGS. 4E-4F, a user controls the device by performing gestures performed with a pointer device 448. For example in FIG. 4E, the device detects a click with a pointer device 448 while a cursor 446 is over the representation of Video Stream B 402 and in FIG. 4F, the device detects movement of the pointer device 448 to the left and navigates through the user interface by sliding a video tile that corresponds to Video Stream B 402 off of display 420 to the left and sliding a video tile that corresponds to Video Stream C 404 onto display 420 from the right. It should be understood that any inputs described herein as corresponding to a contact and movement of the contact on a touchscreen could also be performed in an analogous manner with movements of a pointer device.

Figure 4G:
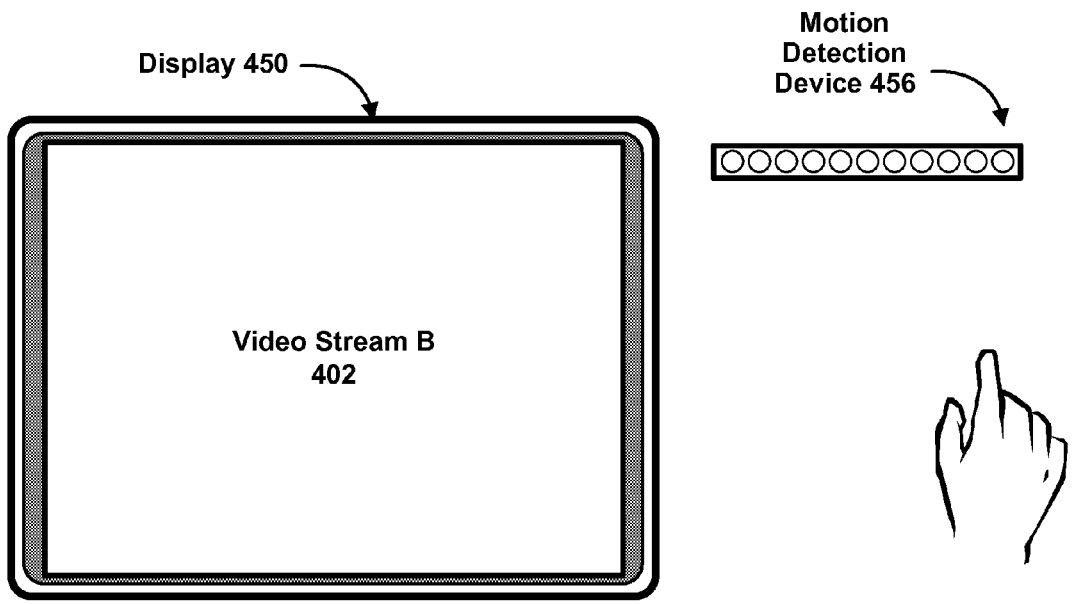
Figure 4H:
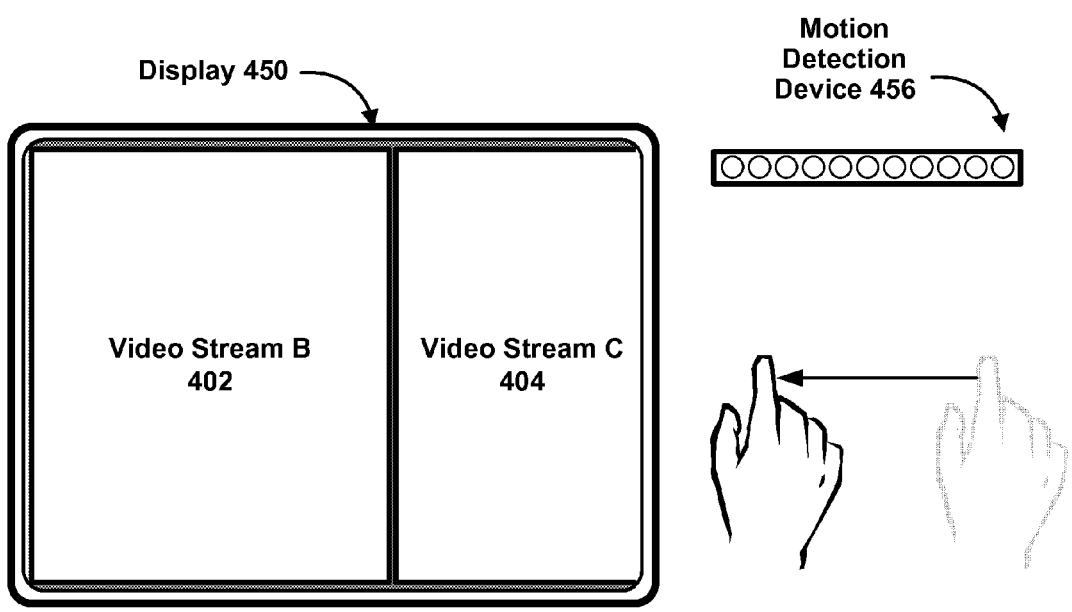

Attention is now directed towards FIGS. 4G-4H, which illustrate a display 420 and a separate motion detection device 456 of an electronic device (e.g., 110 in FIGS. 1A-1B and 2). In FIGS. 4G-4H, a user controls the device by performing gestures detected by motion detection device 456. For example in FIG. 4G, the device detects the presence of a hand in front of motion detection device 456 and in FIG. 4G, the device detects movement of the hand to the left and navigates through the user interface by sliding a video tile that corresponds to Video Stream B 402 off of display 420 to the left and sliding a video tile that corresponds to Video Stream C 404 onto display 420 from the right. Other types of gestures detected by a motion detection device include eye tracking and head movement tracking. It should be understood that any inputs described herein as corresponding to a contact and movement of the contact on a touchscreen could also be performed in an analogous manner with movements of a hand or other body part detected by a motion detection device.

Figure 5A:
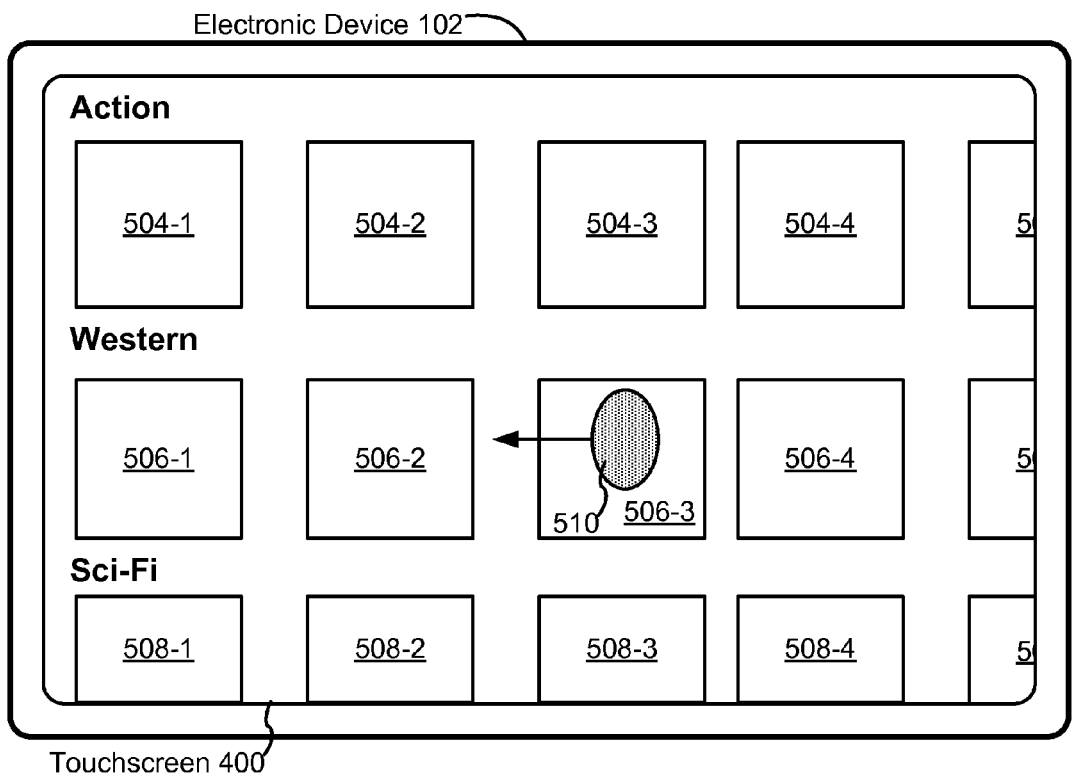
FIGS. 5A-5O illustrate example user interfaces for switching between video channels in accordance with some implementations.
Figure 5B:
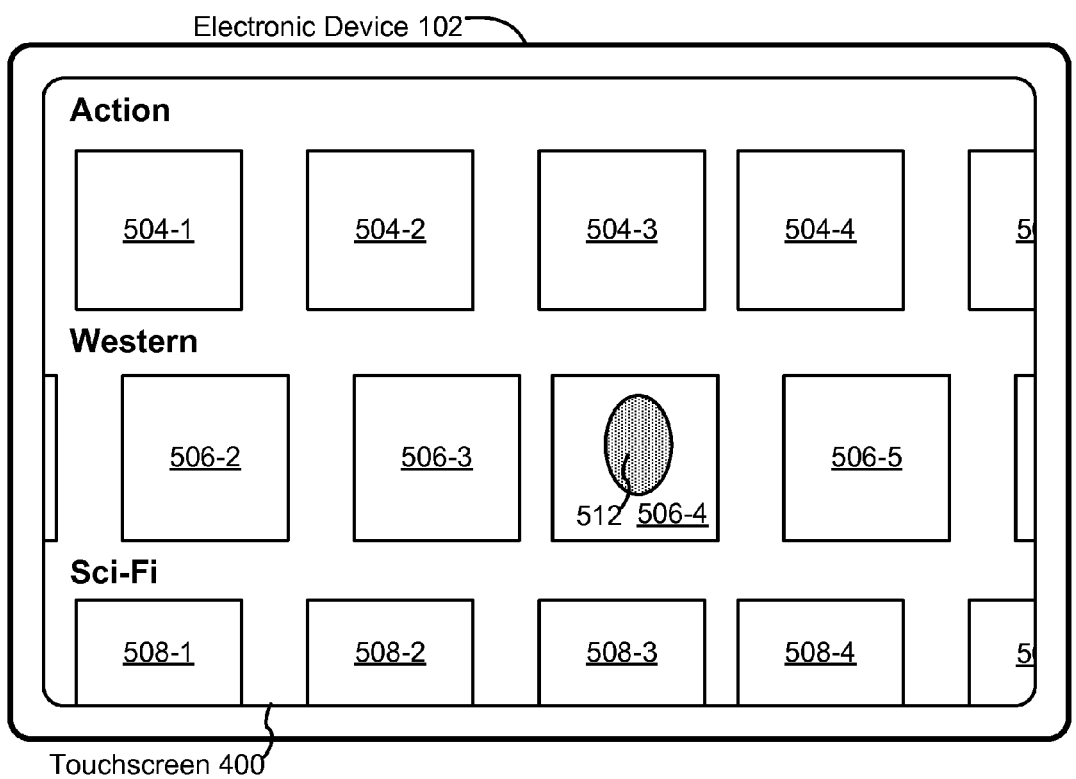
Figure 5C:
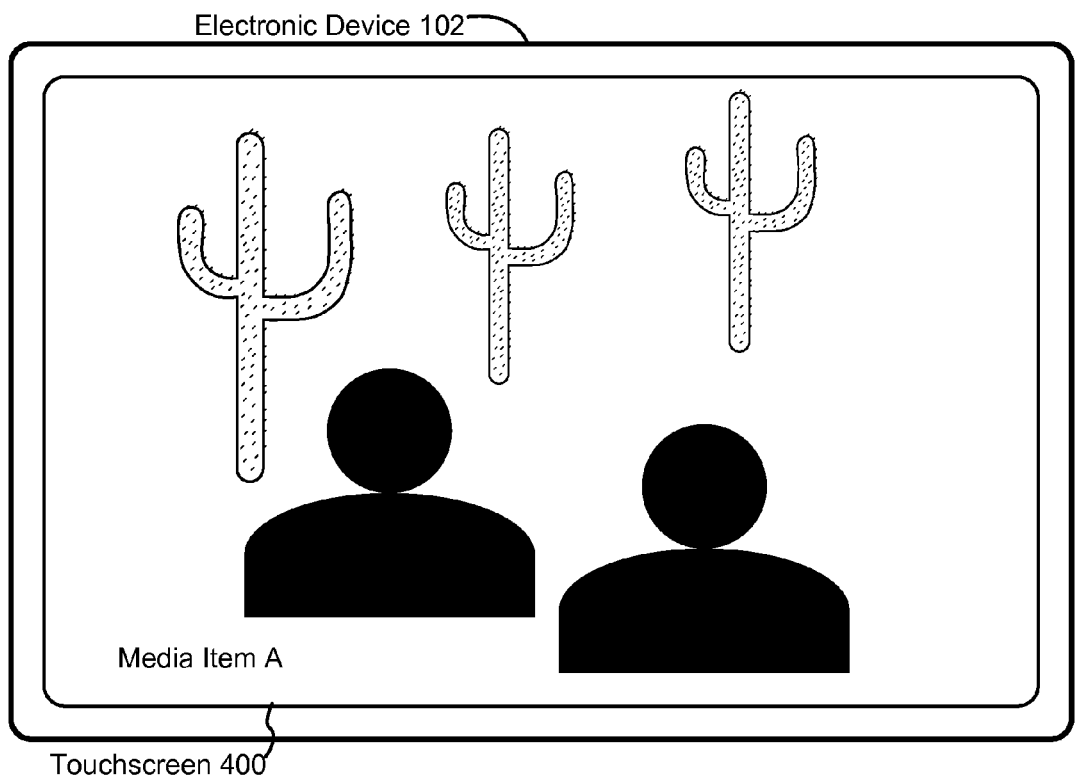
Figure 5D:
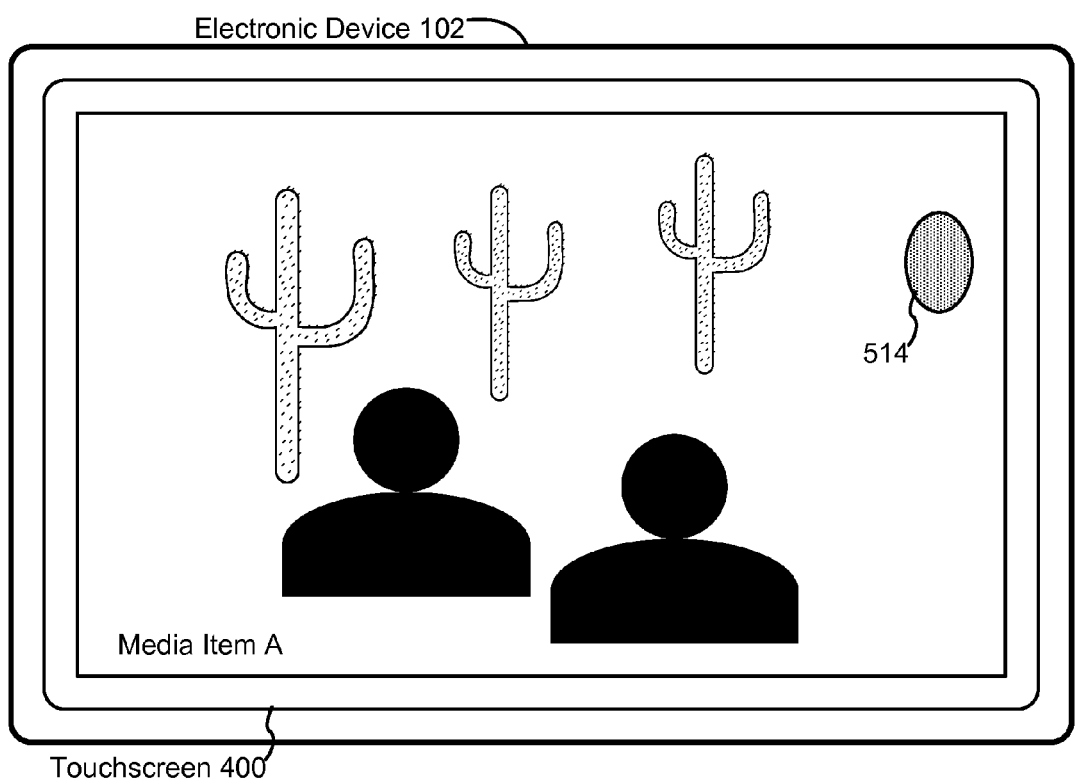
Figure 5E:
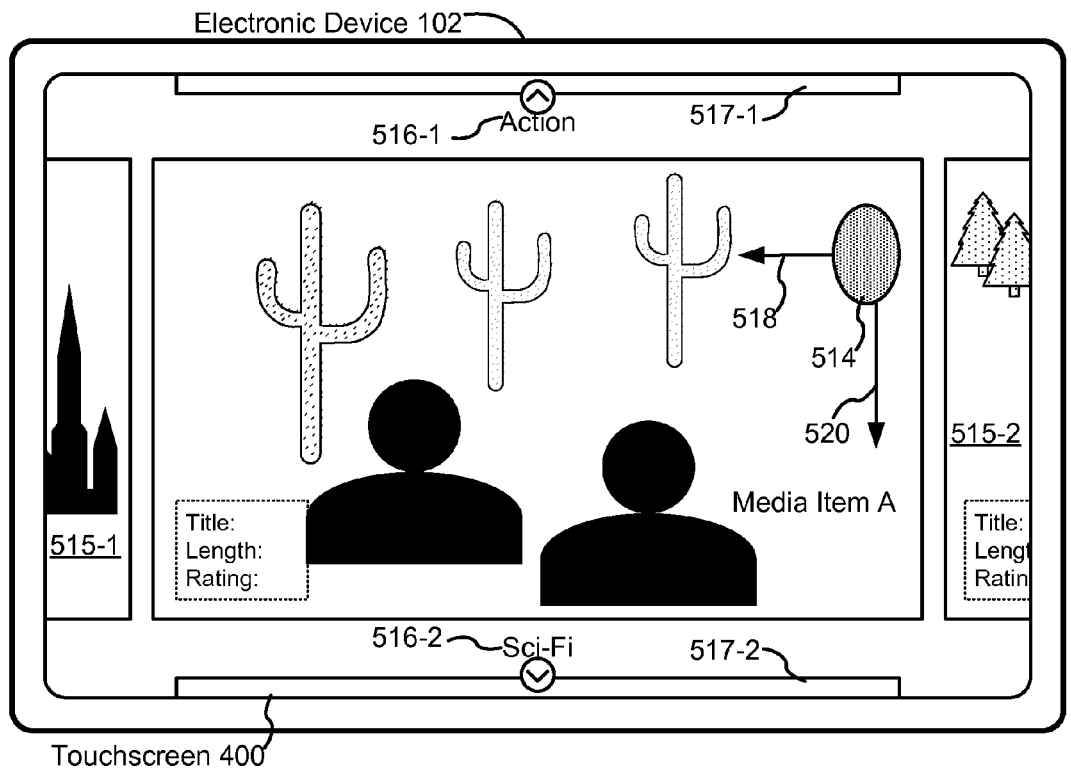
Figure 5F:
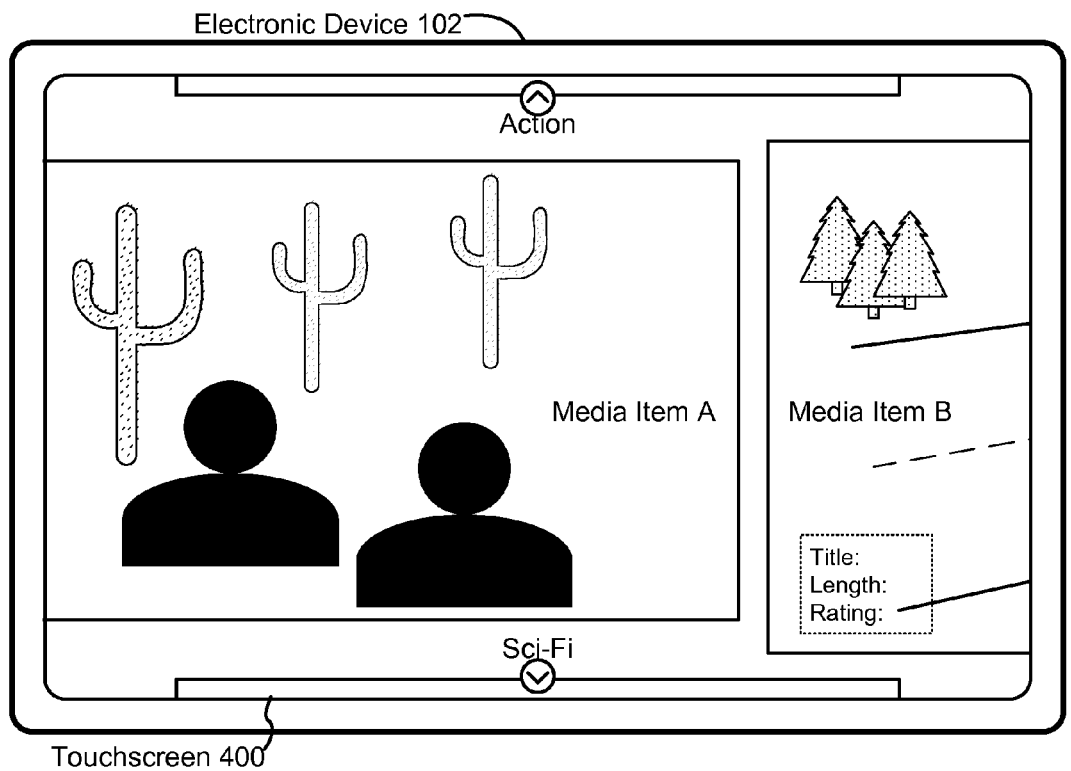
Figure 5G:
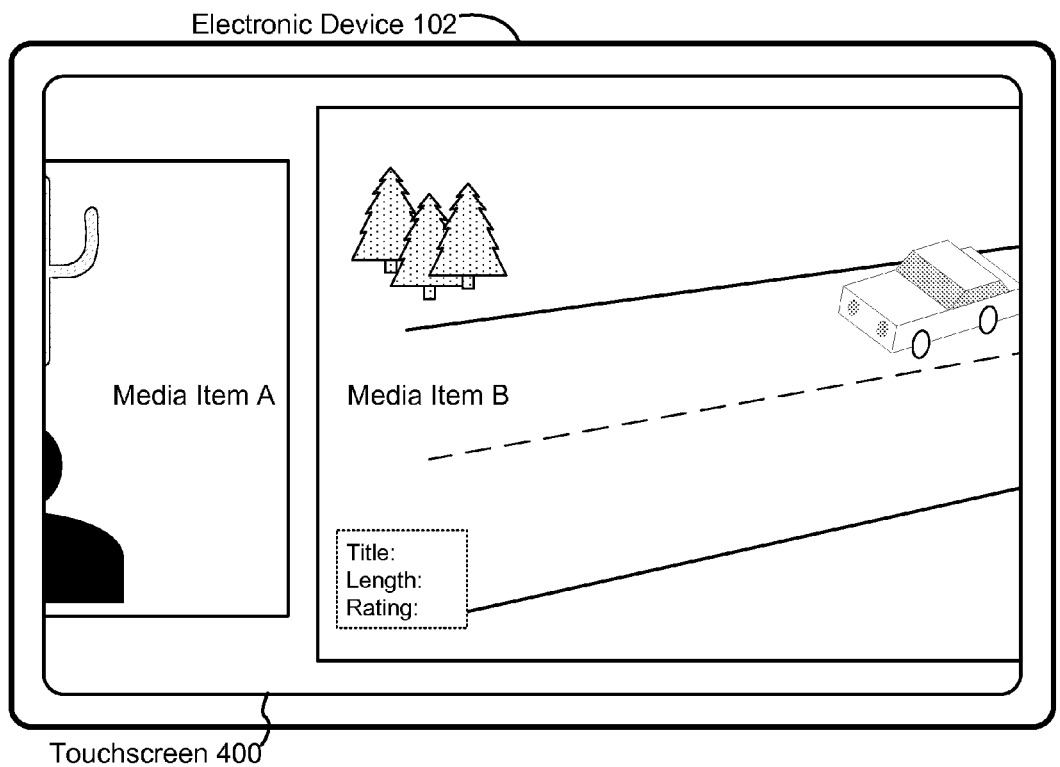
Figure 5H:
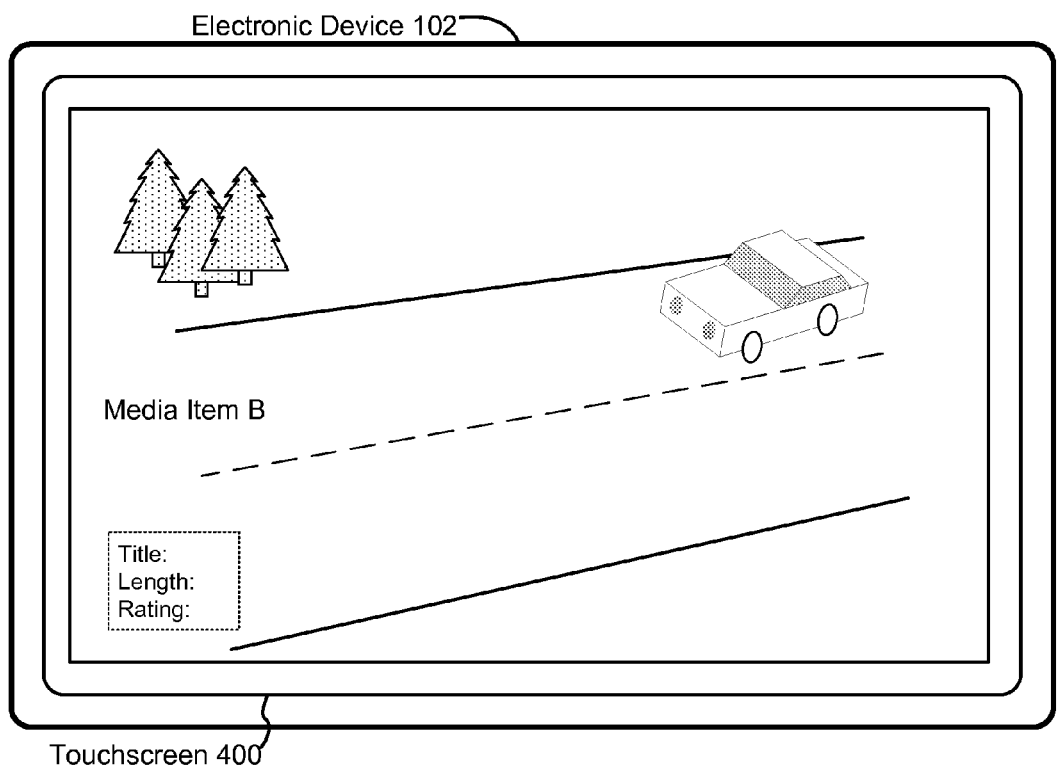
Figure 5I:
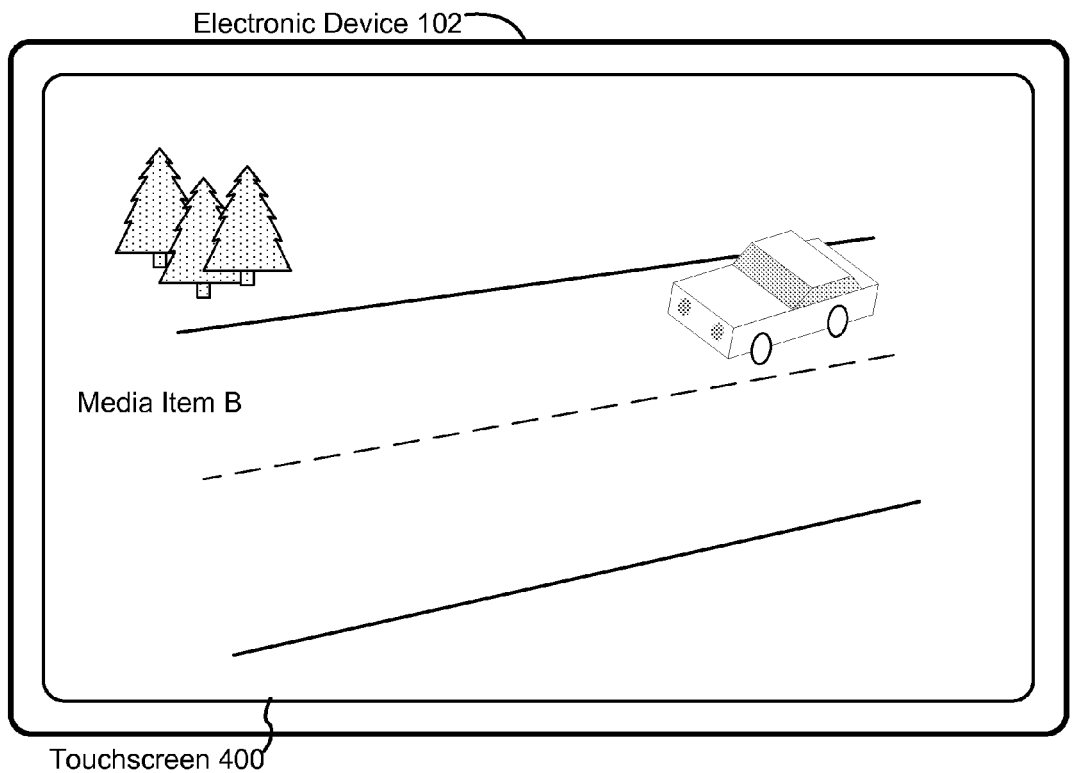
Figure 5J:
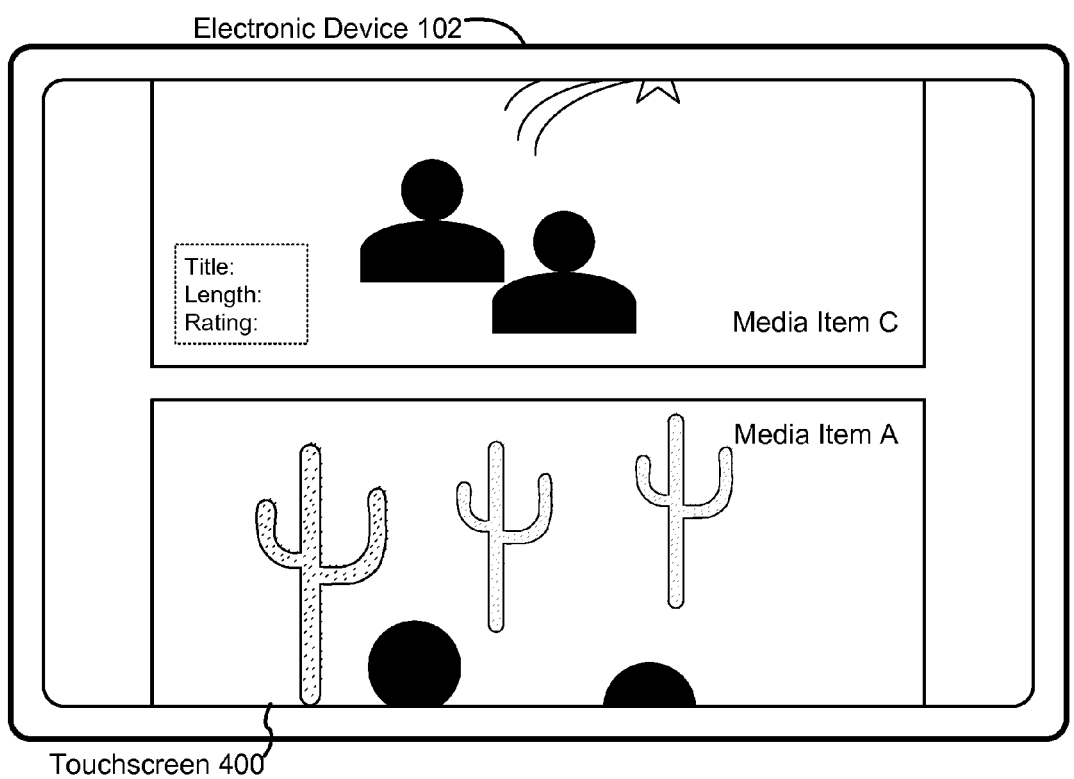
Figure 5K:
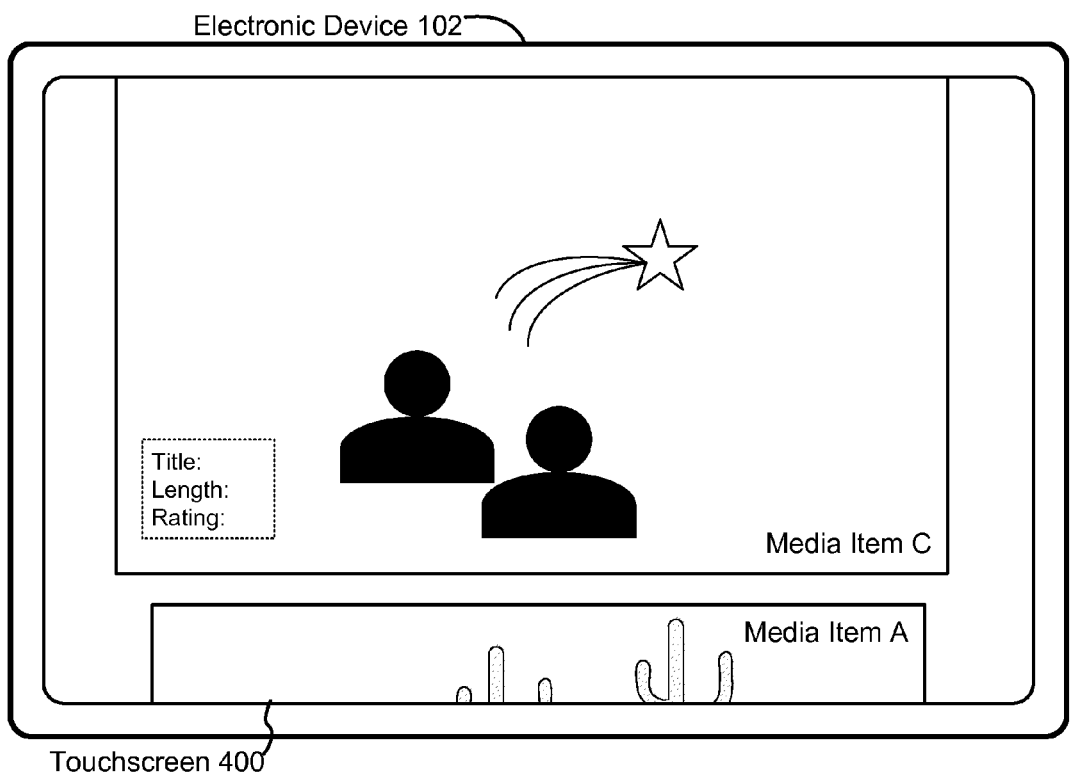
Figure 5L:
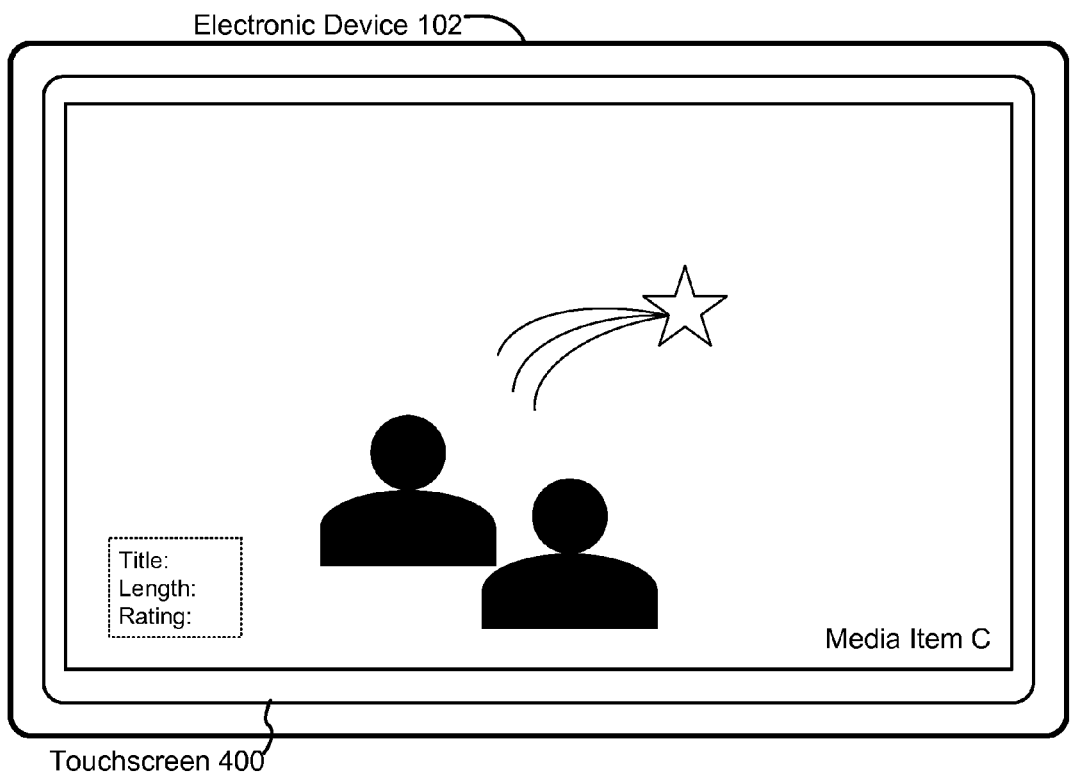
Figure 5M:
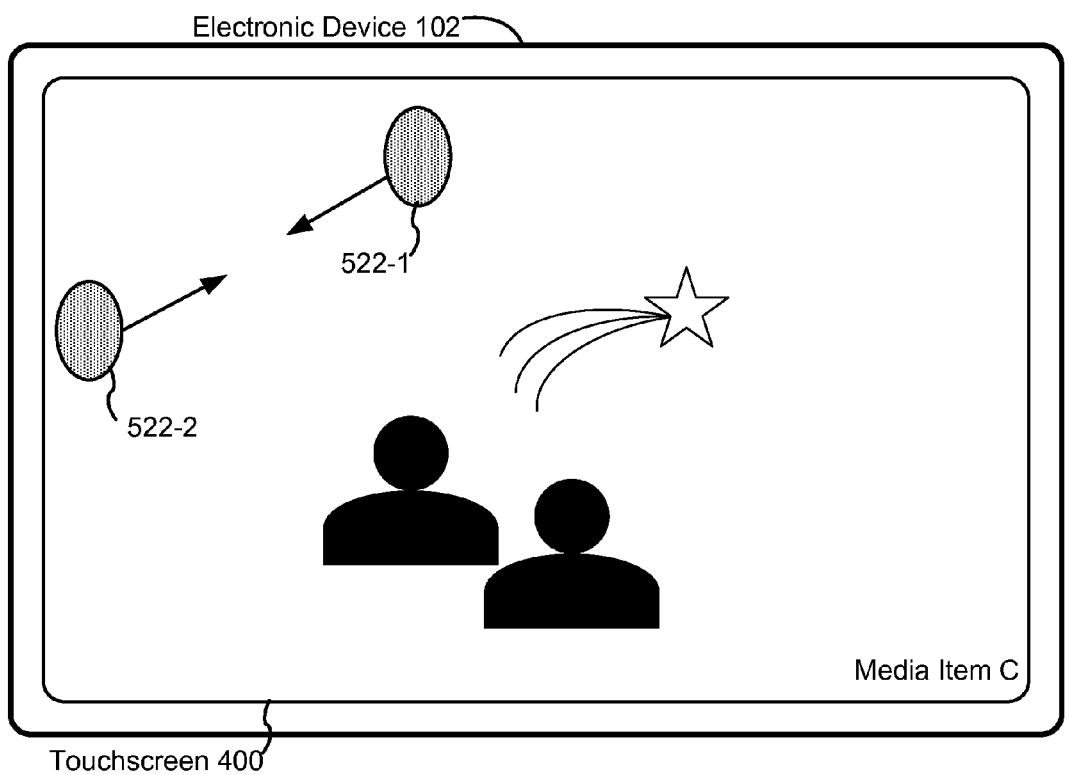
Figure 5N:
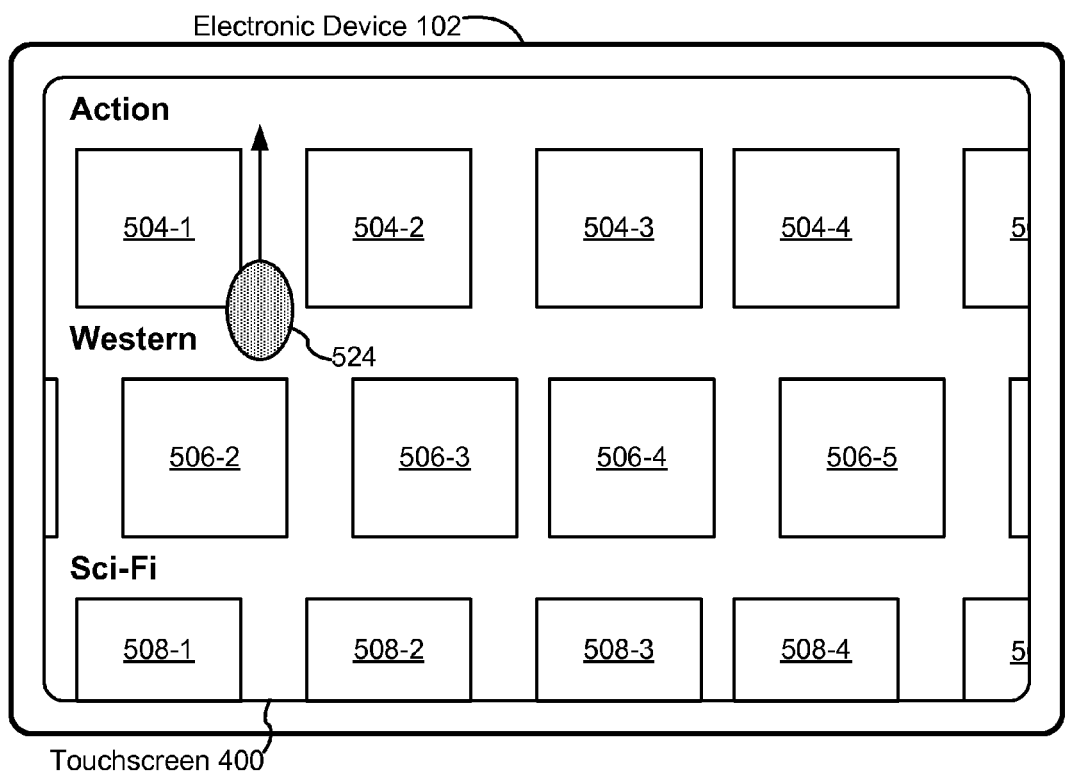
Figure 5O:
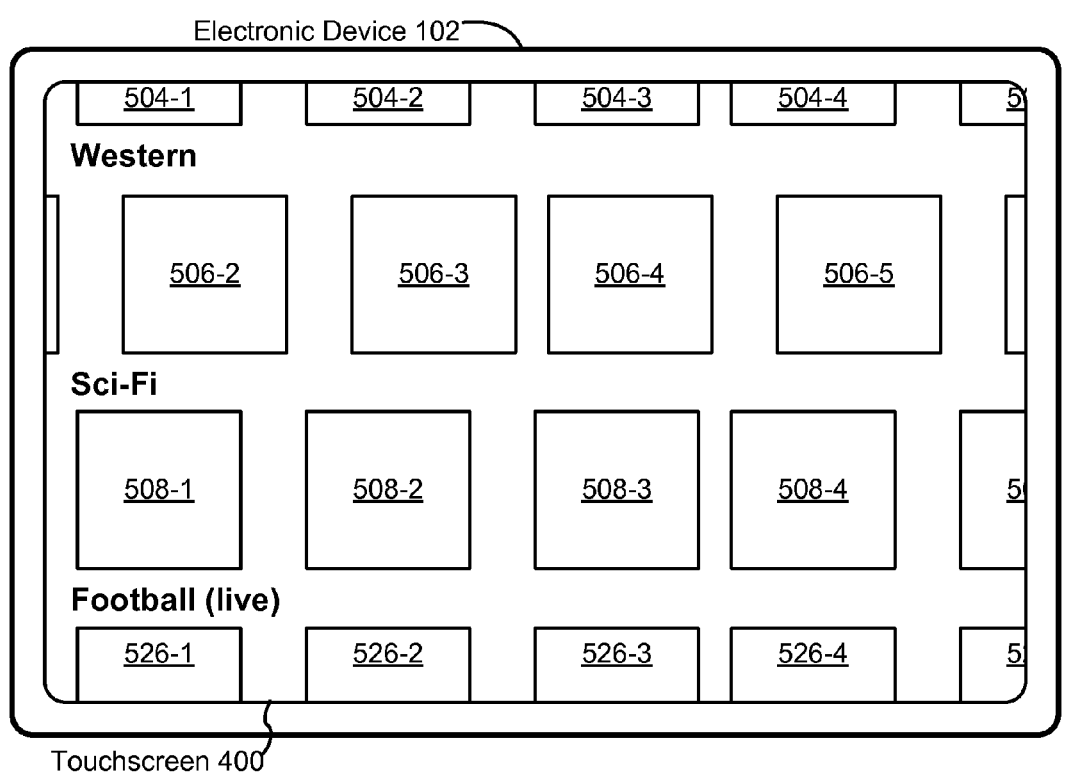

FIGS. 5A-5O illustrate example user interfaces for switching between media items on a device (e.g., device 110 in FIGS. 1A-1B and 2) in accordance with some implementations. FIGS. 5A-5O are described below with reference to touch inputs detected on a touchscreen, however as described above with reference to FIGS. 4A-4H, other input devices could be used in an analogous manner. In FIGS. 5A-5B, device 110 displays a media item directory user interface that includes a plurality of tiles that each correspond to a media item (e.g., a real-time media stream, an on-demand media stream, a media file stored at the device, etc.) in a sequence of media items. In the media item directory user interface in FIGS. 5A-5B, the device displays tiles that correspond to a plurality of sequences of media items including a first sequence of media items 506, a second sequence of media items 504, and a third sequence of media items 508. In FIG. 5A, the device detects a gesture 510 that includes movement of a contact to the left on touchscreen 400 at a location that corresponds to the first sequence of media items 506. In response to detecting gesture 510, the device scrolls the first sequence of media items 506 to the left.

In FIG. 5B, the device detects a tap gesture 512 on the tile 506-4 that corresponds to Media Item A. In FIG. 5C, in response to detecting the tap gesture 512 in FIG. 5B, the device displays a media player user interface with Media Item A, which corresponds to tile 506-4, playing. In FIG. 5D, while Media Item A is playing in a central region of touchscreen 400, the device detects contact 514 on touchscreen 400 and, in response to detecting contact 514, the device starts to display a media-context user interface, by shrinking Media Item A toward a center of touchscreen 400.

In FIG. 5E, the media-context user interface is displayed, showing portions of representations 515 of one or more adjacent media items (e.g., a representation 515-1 of a media items to the left of the currently playing media item, and representation 515-2 of a media items to the right of the currently playing media item), and labels indicating that different sequences of media items are above and below the currently playing media item (e.g., label 516-1 indicates that a sequence of media items that includes action movies is above Media Item A and label 516-2 indicates that a sequence of media items that includes science fiction movies is below Media Item A). In FIG. 5E, the device optionally displays representations 517 of media items in the adjacent sequences of media items that each include a respective still images or portion of video content corresponding to a respective media item in the respective adjacent sequence of media items. In FIG. 5E, the device detects movement 518 of contact 514 to the left.

In response to detecting the movement 518 of contact 514 in FIG. 5E, the device moves Media Item A from a central region of touchscreen 400 and displays Media Item B (an adjacent media item from the sequence of media items that includes Media Item A) in the central region of touchscreen 400, as shown in FIGS. 5F-5G. In addition in response to detecting liftoff of contact 514 from touchscreen 400, the device switches from displaying the media-context user interface in FIG. 5E to displaying the media player user interface as shown in FIG. 5G. While the example shown above shows a leftward swipe of contact 514, it should be understood that if the device detected a rightward swipe of contact 514 instead, Media Item A would slide off the display to the right and the media item to the left of Media Item A in the sequence of media items that includes Media Item A would be displayed in the central region of the display rather than Media Item B.

Alternatively, in response to detecting downward movement 520 of contact 514 as shown in FIG. 5E, the device moves Media Item A from a central region of touchscreen 400 and displays Media Item C (an media item from an adjacent sequence of media items that does not includes Media Item A) in the central region of touchscreen 400, as shown in FIGS. 5J-5M. In addition, in response to detecting liftoff of contact 514 from touchscreen 400, the device switches from displaying the media-context user interface in FIG. 5E to displaying the media player user interface as shown in FIG. 5M. While the example shown above shows a downward swipe of contact 514, it should be understood that if the device detected a upward swipe of contact 514 instead, Media Item A would slide upward off the display and a media item from the sequence of media items below the sequence of media items that includes Media Item A would be displayed in the central region of the display rather than Media Item C. Additionally, in a situation where the device detects liftoff of contact 514 without detecting movement of the contact above a predefined threshold, the device would cease to display the media-context user interface shown in FIG. 5E and would redisplay the media player user interface shown in FIG. 5C.

In FIG. 5M, the device detects a pinch gesture that includes movement of contacts 522-1 and 522-2 toward each other on touchscreen 400 while Media Item C is displayed. In response to detecting the pinch gesture performed with contacts 522, the device ceases to display the media player user interface and redisplays the media item directory user interface, as shown in FIG. 5N. In FIG. 5N, the device detects an upward swipe gesture 524 while the media item directory user interface is displayed. In FIG. 5O, in response to detecting the upward swipe gesture 524, the device scrolls the media item directory to display different sequences of media items including a fourth sequence of media items 526 as shown in FIG. 5O.

Figure 6:
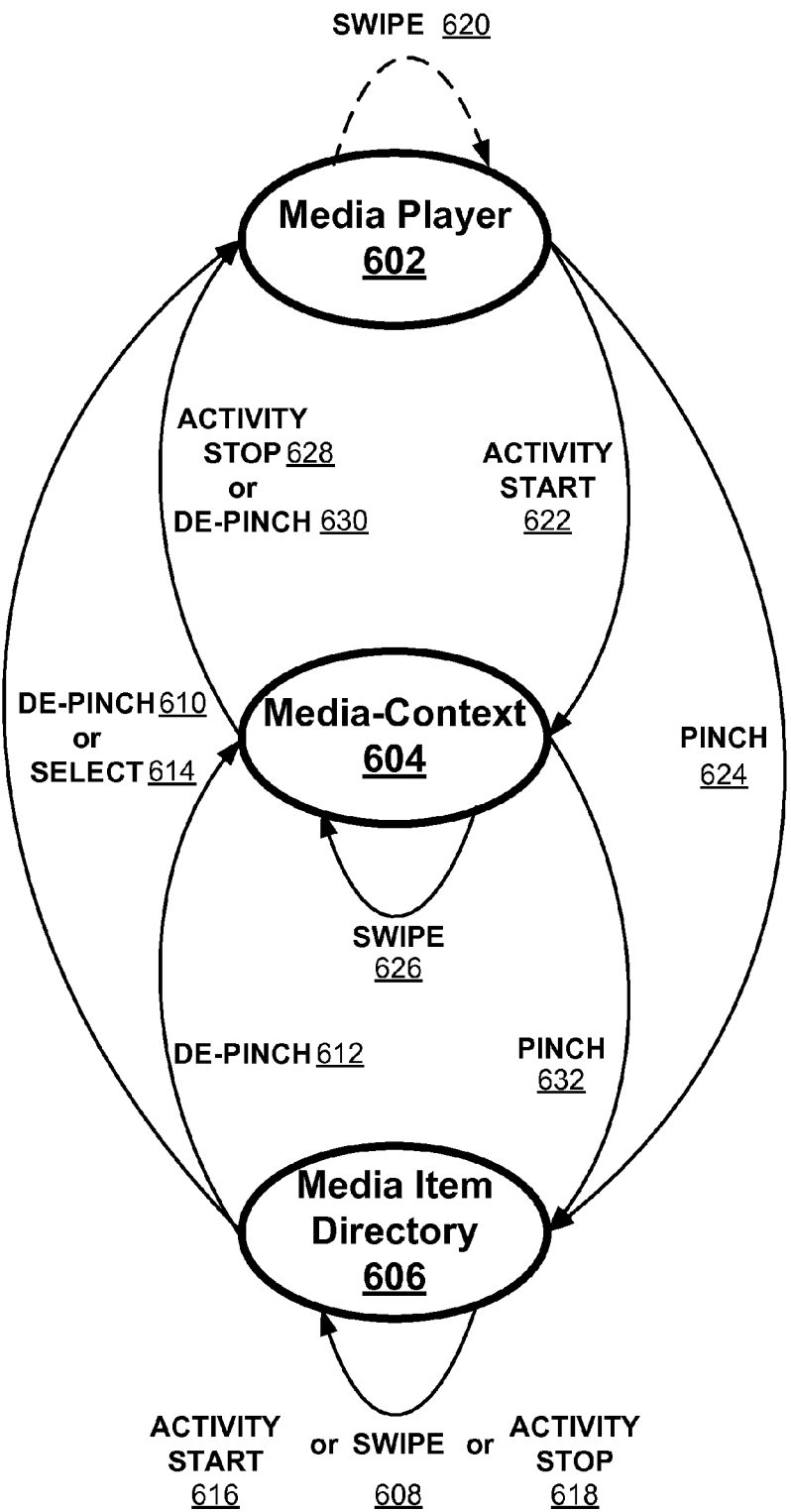
FIG. 6 is a state diagram illustrating transitions between different media presentation user interfaces, in accordance with some implementations.

FIG. 6 is a state diagram illustrating transitions between different media presentation user interfaces, in accordance with some implementations. As described above with reference to FIGS. 5A-5O, there are at least three distinct user interfaces, a media player 602 user interface, a media-context 604 user interface, and a media item directory 606 user interface. In the media player 602 user interface, a primary media item fills or substantially fills the display to provide the user with undistracted viewing of the primary media item (e.g., as shown in FIGS. 5C, 5I and 5M). In the media-context 604 user interface, information about media items other than the primary media item are displayed to provide the user with an indication of the options available for switching to a different media item than the primary media item (e.g., as shown in FIG. 5E). In the media item directory 606 user interface, tiles representing multiple media items in multiple sequences of media items are displayed to provide the user with an overview of a large number (e.g., more than 4 or 5) of available options for selecting a different media item (e.g., as shown in FIGS. 5A-5B and 5N-5O).

In FIG. 6, while the device is displaying the media item directory 606 user interface, if the device detects a swipe 608 gesture (e.g., a gesture that includes lateral movement of a contact or other input), the device navigates within the media item directory without changing to a different user interface. In some implementations, while the device is displaying the media item directory 606 user interface, if the device detects a de-pinch 610 or 612 gesture (e.g., two inputs moving away from each other), the device transitions to the media-context 604 user interface or the media player 602 user interface, optionally depending on the magnitude of the de-pinch gesture (e.g., navigating to the media player 602 user interface when the magnitude of the de-pinch 610 gesture is above a respective threshold and transitioning to the media-context 604 user interface when the magnitude of the de-pinch 612 gesture is below the respective threshold). In some implementations, while the device is displaying the media item directory 606 user interface, if the device detects a de-pinch 612 gesture (e.g., two or more inputs moving away from each other), the device transitions to the media-context 604 user interface. In some implementations, while the device is displaying the media item directory 606 user interface, if the device detects a de-pinch 610 gesture (e.g., two or more inputs moving away from each other), the device transitions to the media player 602 user interface. In FIG. 6, while the device is displaying the media item directory 606 user interface, if the device detects a select 614 gesture (e.g., a tap gesture on a tile, a mouse click while a cursor is over a tile, or a wave gesture in the direction of a tile), the device transitions to the media player 602 user interface and displays a selected media item. In FIG. 6, the media item directory 606 user interface is a "stable" user interface that is maintained even when the user starts 616 or stops 618 activity.

In FIG. 6, while the device is displaying the media player 602 user interface, if the device detects a swipe 620 gesture (e.g., a gesture that includes lateral movement of a contact or other input), the device navigates to an adjacent media item within the media player user interface without changing to a different user interface. In FIG. 6, while the device is displaying the media player 602 user interface, if the device detects a swipe 620 gesture (e.g., a gesture that includes lateral movement of a contact or other input), the device registers an activity start 622 event (e.g., a touchdown, wave, or mouse cursor movement) and transitions to the media-context 604 user interface. In FIG. 6, while the device is displaying the media player 602 user interface, if the device detects an activity start 622 event (e.g., a touchdown, wave, or mouse cursor movement) the device transitions to the media-context 604 user interface. In FIG. 6, while the device is displaying the media player 602 user interface, if the device detects a pinch 624 gesture (e.g., two or more inputs moving toward each other) the device transitions to the media item directory 606 user interface. In FIG. 6, the media player 602 user interface is an "unstable" user interface that transitions to the media-context user interface upon detecting a start 622 of user activity (e.g., touchdown of contact or a start of motion of the user).

In FIG. 6, while the device is displaying the media-context 604 user interface, if the device detects a swipe 626 gesture (e.g., a gesture that includes lateral movement of a contact or other input), the device navigates to an adjacent media item without changing to a different user interface. In FIG. 6, while the device is displaying the media-context 604 user interface, if the device detects an activity stop 628 event (e.g., liftoff of a contact or more than a predetermined amount of time without detected movement of a mouse or detected motion with a motion sensor) or a de-pinch 630 gesture (e.g., two inputs moving away from each other), the device transitions to the media player 602 user interface. In FIG. 6, while the device is displaying the media-context 604 user interface, if the device detects a pinch 632 gesture (e.g., two or more inputs moving toward each other), the device transitions to the media item directory 606 user interface. In FIG. 6, the media-context user interface is a "transitory" user interface that is displayed in response to detecting a start of activity from a user (e.g., touchdown of a contact or movement of a mouse or hand by the user) and transitions to the media player 602 user interface upon detecting an end of the activity (e.g., liftoff of a contact or cessation of motion of the user).

Figure 7:
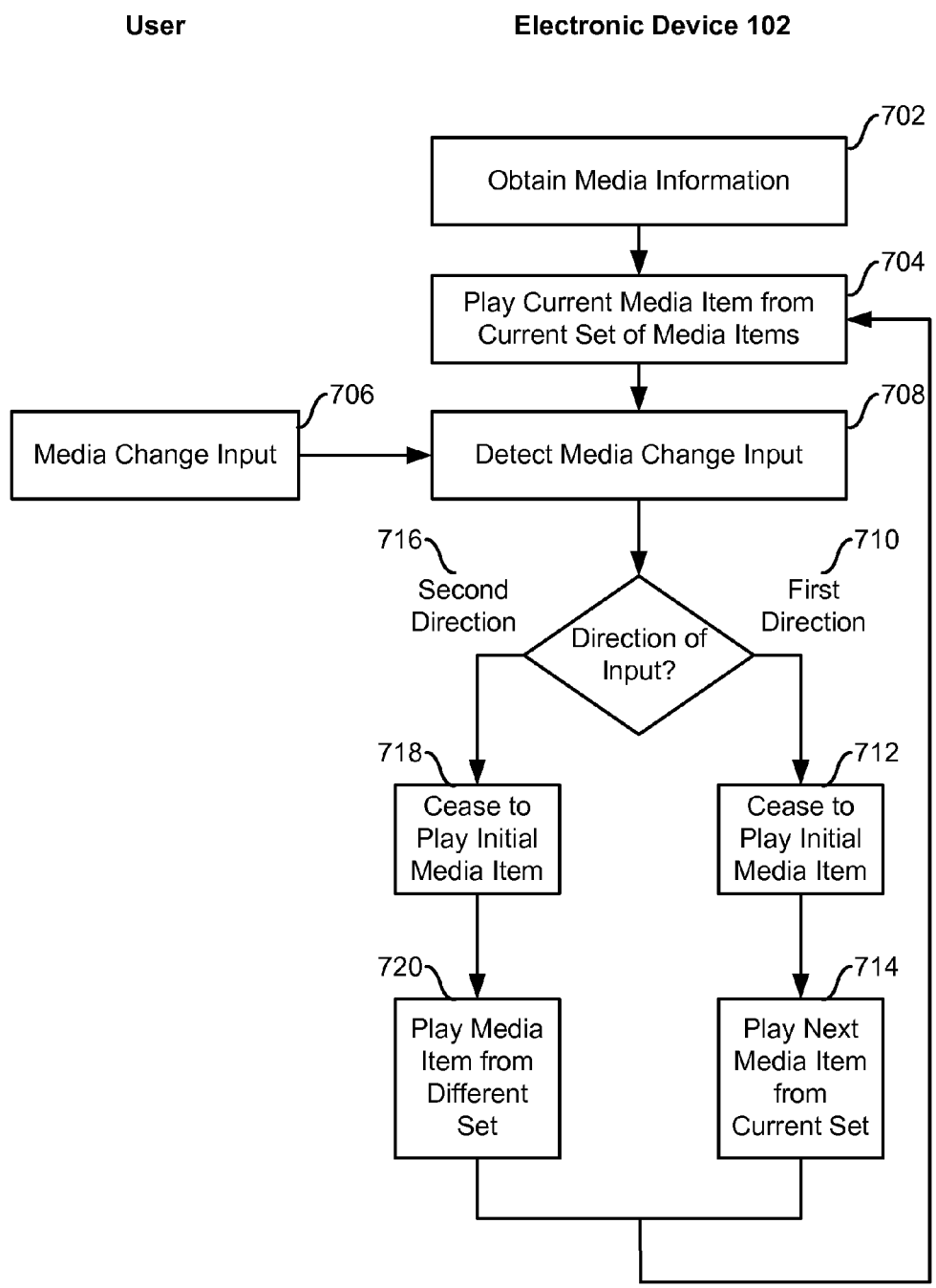
FIG. 7 is a flow diagram illustrating a method of switching between media items, in accordance with some implementations.

FIG. 7 is a flow diagram illustrating a method of switching between media items, in accordance with some implementations. The method 700 is performed at an electronic device (e.g., device 110 as shown in FIGS. 1A-1B and 2)

with a display and a touch-sensitive surface. In some implementations, the display is a touch screen display and the touch-sensitive surface is on the display. In some implementations, the display is separate from the touch-sensitive surface. Some operations in method 700 are, optionally, combined and/or the order of some operations is, optionally, changed. As described below, the method 700 provides an intuitive way to switch between media items. The method reduces the cognitive burden on a user when switching between media items, thereby creating a more efficient human-machine interface. For battery-operated electronic devices, enabling a user to switch between media items faster and more efficiently conserves power and increases the time between battery charges.

A device (e.g., electronic device 110 as shown in FIGS. 1A-1B and 2) obtains (702) information about a plurality of sequences of media items, including a first sequence of media items and a second sequence of media items that is different from the first sequence of media items (e.g., video or audio content). The sequences of media items are optionally represented by tiles that include a visual representation of corresponding media items (e.g., as shown in FIG. 5A). The visual representation optionally includes one or more of: cover art or album art, a recent video still, a relevant or identifying video still (like a still from the episode that uniquely identifies it amongst episodes in the show or season), low bandwidth video, paused or playing on the screen, and/or high definition video, paused or playing on the screen. The sequences of media items are sometimes represented by tiles that include information about corresponding media items represented by the tiles. The information optionally includes one or more of: text information, title, description, user comments, badges, stars, ratings, distribution brand (like CBS), icon, avatar, actor(s), director(s), writer(s), producer(s), reviews, awards, and/or plot summary.

The plurality of sequences of media items optionally include a sequence of episodic media items (e.g., episodes of a television show) in episode order. The plurality of sequences of media items optionally include a user-curated sequence of media items (e.g., a user generated queue) in a user-determined order (e.g., a playlist or video queue determined by a user of the device or a playlist or video queue determined by another user and subscribed to by the user of the device). The plurality of sequences of media items optionally include a sequence of live video streams; and (e.g. television channels in channel order). The plurality of sequences of media items optionally include a sequence of thematically related media items in an order determined in accordance with a user preference profile (e.g., a set of movies that are recommended for the user based on past viewing habits or ratings of other movies and/or television shows). The plurality of sequences of media items optionally include live television channels, like Channel 2, 3, and 4 that correspond to an ordered sequence of broadcast television channels, cable channels, satellite channels, or the like. The plurality of sequences of media items optionally include time shifted recordings of television content, like a VCR or TiVo. The plurality of sequences of media items optionally include on-demand content, like movies or past seasons of a TV show. The plurality of sequences of media items optionally include content genres, like science fiction, news, sports, and drama. The plurality of sequences of media items optionally include sequential media, like episodes 1, 2, and 3 of a show. The plurality of sequences of media items optionally include user activity lists, like starred, history, and/or favorites. The plurality of sequences of media items optionally include lists curated by editors or experts, like staff picks, favorites by an artist or director. The plurality of sequences of media items optionally include suggestions generated based on a user preference profile, like featured, top picks for you. The plurality of sequences of media items optionally include subscribed social lists, like playlists, followed feeds, and/or media items shared/liked/commented on by friends.

In some implementations, the ordering of media items in a respective sequence of media items is based on a predefined content order, like episode 1, 2, 3. The ordering of media items in a respective sequence of media items is optionally based on human generated order (like the first, second, and third items the user chose when assembling a list) or the order as a result of user activity (a history list, for instance, showing the items the user most recently watched, in reverse chronological order). The ordering of media items in a respective sequence of media items is optionally based on a computer generated order, like a list of recommendations, the first item being the algorithms best guess for a content item the user would be interested in viewing now.

The device plays (704) an initially-displayed media item (e.g., an initial media item or a currently playing media item, as shown in FIG. 5C) of the first sequence of media items on a display. In some circumstances, prior to detecting a media-change input (e.g., as described below with reference to operation 708), the device detects a context-display input (e.g., touch-down on a touch screen such as contact 514 detected in FIG. 5D, an initiating tap or waving gesture, a pinch gesture on a touch screen or other gesture) and in response to detecting the context-display input, the device displays a media-context user interface that includes the initially-displayed media item and portions of one or more other media items that were not displayed immediately prior to detecting the context-display input. For example, in FIG. 5D, the device detects contact 514 while playing Media Item A and in response to detecting contact 514, the device displays a media-context user interface, as shown in FIG. 5E.

In some implementations, the initially-displayed media item is displayed without displaying representations of other media items (e.g., the initially-displayed media item is full-screen) and displaying the media-context user interface includes reducing a size of the initially-displayed media item and partially displaying representations of the one or more other media items in regions of the display that were previously occupied by the initially-displayed media item (e.g., the initially-displayed media item is pushed back so that edges of the other media items are displayed adjacent to the other media items). For example, in FIG. 5C, Media Item A is displayed in full screen mode and in FIG. 5E, Media Item A has been reduced in size so that portions of other media items are displayed to the left and the right of Media Item A. In some implementations, the one or more of the representations of other media items include static images (e.g., representations 515 include cover art, a representative video frame, etc.). In some implementations, the one or more of the representations of other media items include video content that is playing (e.g., one or more of representations 515 include playing video content).

A user performs (706) a media change input (e.g., a touch on a touchscreen, a click and drag with a mouse, a wave gesture at a motion sensing device). The media-change input and the context-display input described above are, in some circumstances, part of a continuously detected gesture (e.g., a touch and swipe gesture or a wave and swipe gesture). While playing the initially-displayed media item in a respective (e.g., central) region of the display, the device detects (708) the media-change input. In some implementations, prior to detecting the media-change input, the device preloads at least a portion of one or more media items other than the initially-displayed media item, and in response to detecting the media-change input, displaying a preloaded portion of one of the media items other than the initially-displayed media item. For example, the device requests media content corresponding to one of the adjacent media items before the adjacent media item is requested by a user of the device so as to improve the responsiveness of the device. In some implementations, media items are not preloaded. In situations where all four of the adjacent media items are not preloaded (e.g., to conserve bandwidth), right and top media items are preloaded while other adjacent media items are not (e.g., because users are most likely to swipe down and to the left). Preloading media items that correspond to adjacent media streams is described in greater detail in U.S. Prov. Pat. App. No. 61/836,079, entitled "System and Method for Switching between Media Streams while Providing a Seamless User Experience" filed Jun. 17, 2013, which is hereby incorporated by reference in its entirety.

In response to detecting the media-change input, in accordance with a determination that the media-change input corresponds to movement (710) in a first direction, the device ceases (712) to play the initially-displayed media item in the respective (e.g., central) region of the display (e.g., sliding a video tile that corresponds to the respective media item off of the display in accordance with the media-change input) and plays (714) (e.g., starts to play) a first media item in the respective (e.g., central) region of the display. The first media item is different from the respective media item and is sequentially adjacent to the initially-displayed media item in the first sequence of media items. For example, the first sequence of media items are episodes of a television show and the first media item is a next episode of the television show that comes after the episode of the television show that corresponds to the respective media item. For example, in FIG. 5E, the device detects a swipe gesture that includes leftward movement 518 of contact 514 and in response to detecting the swipe gesture, the device slides Media Item A off of touchscreen 400 to the left and slides Media Item B onto touchscreen 400 from the right.

In contrast, in accordance with a determination that the media-change input corresponds to movement (716) in a second direction that is different from the first direction, the device ceases (718) to play the initially-displayed media item in the respective (e.g., central) region of the display and plays (720) (e.g., starts to play) a second media item in the respective (e.g., central) region of the display. The second media item is different from the initially-displayed media item and the first media item and is from the second sequence of media items. For example, the second sequence of media items is a user-selected queue of on-demand videos, and the second media item is a first item in the user-selected queue. For example, in FIG. 5E, the device detects a swipe gesture that includes downward movement 520 of contact 514 and in response to detecting the swipe gesture, the device slides Media Item A downward off of touchscreen 400 and slides Media Item C onto touchscreen 400 from the top. In the example shown in FIGS. 5E-5N, the first direction is perpendicular to the second direction (e.g., the first direction is substantially horizontal and the second direction is substantially vertical).

In some implementations, the initially-displayed media item has a position in the first sequence of media items that is after a beginning of the first sequence of media items and the second media item has a position at a beginning of the second sequence of media items. Thus, in some of these implementations, regardless of which media item in the first sequence of media items is being displayed, when switching to a media item in a different sequence of media items, the user gets the first (which is the most likely to be relevant, or which is intended to be viewed first) item of that sequence (swiping up from B7 leads to A1, and swiping up from B8 also leads to A1). For example, in FIG. 5B, the device detects selection of tile 506-4 and in response corresponding Media Item A is displayed on touchscreen 400, and subsequent downward swipe gesture including movement 520 of contact 514 in FIG. 5E causes the device to display Media Item C, which corresponds to media tile 504-1 in FIG. 5B, and Media Item C would also be displayed if the device detected a downward swipe gesture while displaying Media Item B. This is particularly helpful in situations where the user is likely to want to switch to the beginning of a sequence when switching between sequences (e.g., switching to a first unwatched episode of a different television show or to a beginning of an automatically generated list of recommended videos, or a beginning of a user-selected queue of videos).

In some implementations, the initially-displayed media item has an ordinal position in the first sequence of media items and the second media item has the same ordinal position in the second sequence of media items. For example, for the sequences of media items shown in FIG. 5A, if the user starts out viewing a media item that corresponds to tile 506-2 in a media player user interface, the user can switch to playing a media item that corresponds to tile 504-2 in the media player user interface by swiping downward and can switch to playing a media item that corresponds to tile 508-2 in the media player interface by swiping upward. Similarly, for the sequences of media items shown in FIG. 5A, if the user starts out viewing a media item that corresponds to tile 506-3 in a media player user interface, the user can switch to playing a media item that corresponds to tile 504-3 in the media player user interface by swiping downward and can switch to playing a media item that corresponds to tile 508-3 in the media player interface by swiping upward. Thus, a user can swipe left, right, up, or down to switch to surrounding tiles that correspond to adjacent media items.

In some implementations, in response to detecting the media-change input, in accordance with a determination that the media-change input corresponds to movement in a third direction that is substantially opposite to the first direction, ceasing to play the initially-displayed media item in the respective (e.g., central) region of the display and playing (e.g., starting to play) a third media item in the respective (e.g., central) region of the display. The third media item is different from the initially-displayed media item, the first media item, and the second media item. For example, when the first direction is a left-to-right direction, the first media item is a media item (e.g., a media item that corresponds to tile 506-3 in FIG. 5A) that precedes the initially-displayed media item (e.g., a media item that corresponds to tile 506-4 in FIG. 5A) in the first sequence and when the first direction is a right-to-left direction, the first media item is a media item (e.g., a media item that corresponds to tile 506-5 in FIG. 5A) that follows the initially-displayed media item in the first sequence. In a situation where, the first sequence of media items are episodes of a television show and the first media item is a prior episode of the television show that comes before the episode of the television show that corresponds to the initially-displayed media item.

In some implementations, in response to detecting the media-change input, in accordance with a determination that the media-change input corresponds to movement in a fourth direction that is substantially opposite to the second direction the device ceases to play the initially-displayed media item in the respective (e.g., central) region of the display and plays (e.g., starts to play) a fourth media item in the respective (e.g., central) region of the display. The fourth media item is different from the initially-displayed media item, the first media item, the second media item, and the third media item, and is from a third sequence of media items that is different from the first sequence of media items and the second sequence of media items. For example, if the media-change input is an upward swipe input, then the fourth media item is from a row of media items below the first row (e.g., an row of media items in the "Sci-Fi" genre that are recommended for the user). In this example, in FIG. 5E, in response to detecting an upward swipe gesture with contact 514, the device would display a media item corresponding to a video tile from the third sequence of media items 508 shown in FIG. 5A.

In some implementations, the device presents a user interface using a respective language (e.g., a default language, a user-selected language, or a language selected based on predefined criteria such as a manufacturing location or operating location of the device). For example, when the respective language is a language that has a left-to-right primary reading direction, (e.g., English) the first direction is along a left-to-right axis of the display. For example, when the respective language is a language that has a top-to-bottom primary reading direction, (e.g., Japanese or Chinese) the first direction is along a top-to-bottom axis of the display. In particular, if the written language is left-to-right, then leftward and rightward swipes cause navigation within a sequence of media items and a downward or upward swipe causes navigation between different sequences of media items; while if written language is top-to-bottom, then a downward or upward swipe causes navigation within the sequence of media items, and a leftward or rightward swipe causes navigation between different sequences of media items.

Thus, in some implementations, the direction in which the sequence of media items is configured to be navigated is chosen based on culture. For example, if the device is set to use a particular language or operate in a particular geographic region with a language that reads left-to-right the device would arrange the tiles to match the reading direction of the particular language or geographic location. Likewise, if the device is set to use a particular language or operate in a particular geographic region with a language that reads top-to-bottom the device would arrange the tiles to match the reading direction of the particular language or geographic location.

In some implementations, while playing a currently playing media item, the device detects a directory-view input (e.g., a pinch gesture). For example, in FIG. 5M, the device detects a pinch gesture that includes movement of contact 522-1 and contact 522-2 toward each other. In response to detecting the directory-view input, the device displays a media item directory that includes representations of a plurality of media items from the first sequence of media items (e.g., video tiles for the plurality of media items 506 in FIG. 5N) and representations of a plurality of media items from the second sequence of media items (e.g., video tiles for the plurality of media items 504 in FIG. 5N). In some implementations, the media item directory is displayed when the directory-view input is detected while the media-context user interface is displayed. In some implementations, the media item directory is displayed when the directory-view input is detected even if the media-context user interface is not displayed. While displaying the media item directory, the device optionally continues to play the currently playing media item and displays static representations of the other media items in the media item directory (e.g., cover art, a representative video frame, etc.). For example, if Media Item C corresponds to tile 504-1 in FIG. 5N, then video corresponding to Media Item C continues to play in tile 504-1. While displaying the media item directory, the device optionally continues to play the currently playing media item and plays one or more other media items in the media item directory on the display (e.g., one or more of the other video tiles 504, 506 or 508 in FIG. 5N also includes playing video content).

In some implementations, while displaying a directory view that includes a large number of video tiles, the device plays video in a recently active video tile while displaying non-video content (e.g., images or text corresponding to the content associated with the video tiles) in the other video tiles. For example, in FIG. 5B, if tile 506-4 is the recently active tile, video is displayed in tile 506-4 while still images are displayed in tiles 504 and 508, 506-2, 506-3 and 506-5. In response to detecting a first selection of a selected video tile in the plurality of video tiles in the directory view (e.g., detecting a tap gesture on the selected video tile), the device zooms in (e.g., 80% zoom) to the selected video tile and plays, in the selected video tile, video that corresponds to the selected video tile and plays video that corresponds to one or more of the adjacent video tiles in the adjacent vide tiles. For example, in response to detecting tap gesture 512 in FIG. 5B, the device zooms in on tile 506-4 to display Media Item A and also displays video content in one or more of representation 515-1, 515-2, 517-1, and 517-2 in FIG. 5E, even though video content was not displayed in the corresponding tiles in FIG. 5B. While the device is playing video that corresponds to the selected video tile and the adjacent video tile(s), if the device detects a second selection of the selected video tile (e.g., detecting a tap gesture on the selected video tile), in response to detecting the second selection of the selected video tile, the device zooms in (e.g., 100% zoom) and plays video that corresponds to the selected video tile without playing video that corresponds to the adjacent video tile(s) (e.g., by displaying the video that corresponds to the selected video tile at full screen). For example, in response to detecting a tap gesture at a location that corresponds to Media Item A, the device transitions from the media-context user interface shown in FIG. 5E to the media player user interface shown in FIG. 5C.

In some implementations, prior to playing the initially-displayed media item, the device displays a media item directory in a respective arrangement (e.g., with the first sequence of media items, the second sequence of media items and, optionally, one or more other sequences of media items displayed in a particular order on the display). For example, in FIG. 5B a media item directory is displayed in a particular arrangement. After displaying the media item directory in the respective arrangement, the device detects selection of a representation of the initially-displayed media item in the media item directory. For example, the device detects a tap gesture (e.g., tap gesture 512 on tile 506-4 in FIG. 5B) or a de-pinch gesture at a location that corresponds to the representation of the initially-displayed media item in the respective (e.g., central) region of the display. In response to detecting selection of the representation of the initially-displayed media item, the device ceases to display the media item directory and plays the initially-displayed media item (e.g., Media Item A, which corresponds to tile 506-4, is playing in FIG. 5C). After ceasing to play the initially-displayed media item and starting to play a different media item (e.g., the first media item, the second media item, the third media item, or the fourth media item, depending on the direction of the media-change input) the device detects a directory-view input. For example, in FIG. 5M, the device detects a pinch gesture that includes movement of contact 522-1 and contact 522-2 toward each other. In response to detecting the directory-view input, the device displays the media item directory in the respective arrangement. For example, in FIG. 5N, the device redisplays the media item directory in the same arrangement in which it was displayed in FIG. 5B. Thus, in some implementations, even when the user switches between playing different media items while in a full screen content viewing mode, when the user returns to the media item directory, the media item directory is shown in the same arrangement of the media item directory that was displayed when the user entered the full screen content viewing mode.

In some implementations, the initially-displayed media item corresponds to on-demand content, and ceasing to play the initially-displayed media item includes ceasing to play the initially-displayed media item at a stop point (e.g., a particular timestamp). After ceasing to play the initially-displayed media item that corresponds to on-demand content, the device detects a predefined input that corresponds to a request to resume playing the initially-displayed media item and in response to detecting the predefined input, the device resumes playing the initially-displayed media item at a predefined point relative to the stop point. For example, the device detects a predefined input that corresponds to movement that is substantially opposite to the movement that corresponds to the media-change input and, in response, resumes playing the initially-displayed media item at the stop point, a predefined interval before the stop point, or a predefined interval after the stop point. For example, if Media Item A is on-demand content, when the device navigates to Media Item B in response to a right-to-left swipe, as shown in FIGS. 5E-5I, the device stops playing Media Item A and if the user requests that the device switch back to Media Item A (e.g., by performing a left-to-right swipe on Media Item B), Media Item A is restarted at the place where Media Item A stopped (e.g., the user's place in Media Item A is saved).

In some implementations, the initially-displayed media item corresponds to live content, and ceasing to play the initially-displayed media item includes ceasing to play the initially-displayed media item at a stop point (e.g., a particular timestamp). After ceasing to play the initially-displayed media item that corresponds to live content the device detects a predefined input that corresponds to a request to resume playing the initially-displayed media item and in response to detecting the predefined input, the device resumes playing the initially-displayed media item at a current point in the initially-displayed media item that is different from the stop point. For example, the device detects a predefined input that corresponds to movement that is substantially opposite to the movement that corresponds to the media-change input and, in response, the device resumes playing the live content "live" without regard to the location of the stop point in the respective media content. For example, if Media Item A is live content, when the device navigates to Media Item B in response to a right-to-left swipe, as shown in FIGS. 5E-5I, the device stops playing Media Item A and if the user requests that the device switch back to Media Item A (e.g., by performing a left-to-right swipe on Media Item B), Media Item A is restarted with live content, which means that the user misses some of the live content that occurred while the user was not watching Media Item A. In some circumstances (e.g., if the device determines that the user is likely to switch back to viewing the live content), the device continues to receive the live content after the user has switched away from the media tile that corresponds to the live content (e.g., the device buffers additional live content and/or periodically refreshes a buffer of the live content so that the live content can be restarted quickly with a recent portion of the live content if the user switches back to the live content).

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. For brevity, these details are not repeated here.

Plural instances are, optionally provided for components, operations, or structures described herein as a single instance. Finally, boundaries between various components, operations, and data stores are somewhat arbitrary, and particular operations are illustrated in the context of specific illustrative configurations. Other allocations of functionality are envisioned and optionally fall within the scope of the implementation(s). In general, structures and functionality presented as separate components in the example configurations are, optionally, implemented as a combined structure or component. Similarly, structures and functionality presented as a single component are, optionally, implemented as separate components. These and other variations, modifications, additions, and improvements fall within the scope of the implementation(s).

It will also be understood that, although the terms "first," "second," are, in some circumstances, used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter is, optionally, practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method of providing media content, comprising:
at an electronic device with one or more processors, memory, and a touchscreen:
playing a first media item in a full-screen mode on the touchscreen;
in response to detecting a contact on the touchscreen:
shrinking the first media item from the full-screen mode into a region of the touchscreen,
continuing to play the first media item in the region, and
displaying a second media item to the left of the first media item, a third media item to the right of the first media item, a fourth media item below the first media item, and a fifth media item above the first media item; and
in response to detecting movement of the contact:
moving the shrunken first media item away from the region, and
moving a new media item into the region, wherein the new media item is selected from the group consisting of the second media item, the third media item, the fourth media item, and the fifth media item.

2. The method of claim 1, wherein the region is a central region of the touchscreen.

3. The method of claim 1, further comprising:
in response to detecting liftoff of the contact, playing the new media item in a full-screen mode on the touchscreen.

4. The method of claim 1, wherein:
moving the shrunken first media item away from the region comprises moving the first media item in a direction of the movement of the contact; and
moving the new media item into the region comprises moving the new media item in the direction of the movement of the contact.

5. The method of claim 1, wherein the first media item and the new media item are from a same sequence of media items.

6. The method of claim 1, wherein the first media item is from a first sequence of media items and the new media item is from a second sequence of media items different from the first sequence of media items.

7. The method of claim 1, wherein displaying the second, third, fourth, and fifth media items comprises playing video content for the second, third, fourth, and fifth media items.

8. An electronic device, comprising:
one or more processors; and
memory storing one or more programs configured to be executed by the one or more processors, the one or more programs including instructions for:
playing a first media item in a full-screen mode on the touchscreen;
in response to detecting a contact on the touchscreen:
shrinking the first media item from the full-screen mode into a region of the touchscreen,
continuing to play the first media item in the region, and
displaying a second media item to the left of the first media item, a third media item to the right of the first media item, a fourth media item below the first media item, and a fifth media item above the first media item; and
in response to detecting movement of the contact:
moving the shrunken first media item away from the region, and
moving a new media item into the region, wherein the new media item is selected from the group consisting of the second media item, the third media item, the fourth media item, and the fifth media item.

9. The electronic device of claim 8, wherein the region is a central region of the touchscreen.

10. The electronic device of claim 8, wherein the one or more programs further include instructions for:
in response to detecting liftoff of the contact, playing the new media item in a full-screen mode on the touchscreen.

11. The electronic device of claim 8, wherein:
the instructions for moving the shrunken first media item away from the region comprise instructions for moving the first media item in a direction of the movement of the contact; and
the instructions for moving the new media item into the region comprise instructions for moving the new media item in the direction of the movement of the contact.

12. The electronic device of claim 8, wherein the first media item is from a first sequence of media items and the new media item is from a second sequence of media items different from the first sequence of media items.

13. The electronic device of claim 8, wherein the instructions for displaying the second, third, fourth, and fifth media items comprise instructions for playing video content for the second, third, fourth, and fifth media items.

14. A non-transitory computer-readable storage medium storing one or more programs, the one or more programs comprising instructions, which when executed by an electronic device, cause the electronic device to:
play a first media item in a full-screen mode on the touchscreen;
in response to detecting a contact on the touchscreen:
shrink the first media item from the full-screen mode into a region of the touchscreen, continue to play the first media item in the region, and
display a second media item to the left of the first media item, a third media item to the right of the first media item, a fourth media item below the first media item, and a fifth media item above the first media item; and
in response to detecting movement of the contact:
move the shrunken first media item away from the region, and
move a new media item into the region, wherein the new media item is selected from the group consisting of the second media item, the third media item, the fourth media item, and the fifth media item.

15. The computer-readable storage medium of claim 14, wherein the region is a central region of the touchscreen.

16. The computer-readable storage medium of claim 14, wherein the one or more programs further comprise instructions, which when executed by the electronic device, cause the electronic device to:
in response to detecting liftoff of the contact, play the new media item in a full-screen mode on the touchscreen.

17. The computer-readable storage medium of claim 14, wherein:
the instructions that cause the electronic device to move the shrunken first media item away from the region comprise instructions that cause the electronic device to move the first media item in a direction of the movement of the contact; and
the instructions that cause the electronic device to move the new media item into the region comprise instructions that cause the electronic device to move the new media item in the direction of the movement of the contact.

18. The computer-readable storage medium of claim 14, wherein the first media item is from a first sequence of media items and the new media item is from a second sequence of media items different from the first sequence of media items.

19. The computer-readable storage medium of claim 14, wherein the instructions that cause the electronic device to display the second, third, fourth, and fifth media items comprise instructions that cause the electronic device to play video content for the second, third, fourth, and fifth media items.

20. The computer-readable storage medium of claim 14, wherein the first media item and the new media item are from a same sequence of media items.

\* \* \* \* \*